US009558326B2

(12) United States Patent
Sugiura

(10) Patent No.: US 9,558,326 B2
(45) Date of Patent: Jan. 31, 2017

(54) INFORMATION PROCESSING APPARATUS, PROGRAM INTRODUCTION ASSISTANCE SYSTEM AND COMPUTER READABLE INFORMATION RECORDING MEDIUM

(75) Inventor: Yuuko Sugiura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 806 days.

(21) Appl. No.: 12/879,253

(22) Filed: Sep. 10, 2010

(65) Prior Publication Data

US 2011/0066972 A1    Mar. 17, 2011

(30) Foreign Application Priority Data

Sep. 14, 2009  (JP) ................. 2009-212447

(51) Int. Cl.
| G06F 3/0483 | (2013.01) |
| G06F 3/0481 | (2013.01) |
| G06F 3/0482 | (2013.01) |
| G06F 3/048 | (2013.01) |
| G06F 3/00 | (2006.01) |
| G06F 21/10 | (2013.01) |

(Continued)

(52) U.S. Cl.
CPC ................. *G06F 21/10* (2013.01); *G06F 8/61* (2013.01); *G06F 9/4446* (2013.01)

(58) Field of Classification Search
CPC .... G06F 3/0483; G06F 3/0481; G06F 3/0482; G06F 9/4443; G06F 3/04817; G06F 3/04847; G06F 3/04812; G06F 5/06; G06Q 10/10; G09G 5/14; G09G 5/06
USPC ........................ 715/810, 764, 806
See application file for complete search history.

(56) References Cited

U.S. PATENT DOCUMENTS

| 6,075,943 A | * | 6/2000 | Feinman ................ 717/175 |
| 6,275,987 B1 | * | 8/2001 | Fraley et al. ........... 717/127 |
| 6,564,375 B1 | * | 5/2003 | Jiang .................. 717/165 |

(Continued)

FOREIGN PATENT DOCUMENTS

| JP | 2003-316581 | 11/2003 |
| JP | 2005-135294 | 5/2005 |

(Continued)

OTHER PUBLICATIONS

Japanese Office Action dated Jan. 29, 2013.

(Continued)

*Primary Examiner* — Amy Ng
*Assistant Examiner* — Erik Stitt
(74) *Attorney, Agent, or Firm* — IPUSA, PLLC

(57) ABSTRACT

An information processing apparatus that is connected with one or plural apparatuses via a predetermined data transmission path, includes a control part that controls a program introduction process that is carried out in plurality of work stages of work of introducing a program to the one or plural apparatuses; a generation part that generates display screen pages corresponding to the work stages, based on a carrying out request of a user and/or carrying out results of one or more of the program introduction processes that have been carried out by the control part in response to the carrying out request; and a renewing part that renews the display screen page currently displayed on a display device of the information processing apparatus with the currently generated display screen page according to a renewing request of the generation part.

10 Claims, 18 Drawing Sheets

(51) Int. Cl.
*G06F 9/445* (2006.01)
*G06F 9/44* (2006.01)

(56) References Cited

U.S. PATENT DOCUMENTS

| | | | |
|---|---|---|---|
| 6,618,857 B1* | 9/2003 | Zimniewicz | G06F 8/63 |
| | | | 707/999.202 |
| 6,698,018 B1* | 2/2004 | Zimniewicz et al. | 717/175 |
| 6,744,450 B1* | 6/2004 | Zimniewicz et al. | 715/841 |
| 6,910,208 B1* | 6/2005 | Zimniewicz | 717/174 |
| 7,089,500 B2* | 8/2006 | Li | 715/763 |
| 7,200,645 B2* | 4/2007 | Brown et al. | 709/219 |
| 7,206,828 B1* | 4/2007 | Bourke-Dunphy et al. | 709/221 |
| 7,228,542 B2* | 6/2007 | Bryant et al. | 717/177 |
| 7,290,215 B2* | 10/2007 | Bybee et al. | 715/760 |
| 7,356,773 B1* | 4/2008 | Barraclough | 715/762 |
| 7,398,480 B2* | 7/2008 | Zimniewicz et al. | 715/841 |
| 7,895,526 B2* | 2/2011 | Evans | 715/762 |
| 8,806,476 B2* | 8/2014 | Kapoor et al. | 717/175 |
| 2002/0157089 A1* | 10/2002 | Patel | G06F 8/65 |
| | | | 717/178 |
| 2003/0218628 A1 | 11/2003 | Deshpande et al. | |
| 2003/0222908 A1* | 12/2003 | Bybee et al. | 345/749 |
| 2004/0003345 A1* | 1/2004 | Brown et al. | 715/501.1 |
| 2005/0075115 A1* | 4/2005 | Corneille et al. | 455/456.3 |
| 2006/0020937 A1 | 1/2006 | Schaefer | |
| 2006/0200420 A1* | 9/2006 | Osada | G06F 21/10 |
| | | | 705/59 |
| 2006/0221372 A1 | 10/2006 | Onishi et al. | |
| 2007/0198427 A1* | 8/2007 | Vajjiravel | G06Q 30/06 |
| | | | 705/59 |
| 2007/0220510 A1 | 9/2007 | Bell et al. | |
| 2008/0209569 A1 | 8/2008 | Araki | |
| 2008/0244057 A1 | 10/2008 | Kojima | |
| 2009/0282146 A1 | 11/2009 | Nakano | |
| 2010/0058482 A1 | 3/2010 | Nagumo et al. | |
| 2010/0071069 A1 | 3/2010 | Sugiura et al. | |
| 2011/0016414 A1* | 1/2011 | Ernst et al. | 715/764 |

FOREIGN PATENT DOCUMENTS

| | | |
|---|---|---|
| JP | 2006-133825 A | 5/2006 |
| JP | 2006-139364 A | 6/2006 |
| JP | 2006-285774 | 10/2006 |
| JP | 2006-309726 A | 11/2006 |
| JP | 2008-507775 | 3/2008 |
| JP | 2008-243179 | 10/2008 |
| JP | 2009-301535 | 12/2009 |

OTHER PUBLICATIONS

Extended European Search Report dated Dec. 13, 2010.
Japanese Office Action dated Nov. 5, 2013.
Japanese Office Action dated Feb. 25, 2014.
Japanese Office Action dated May 12, 2015.
Japanese Office Action dated Jan. 6, 2015.
European Office Action dated Jan. 22, 2016.

* cited by examiner

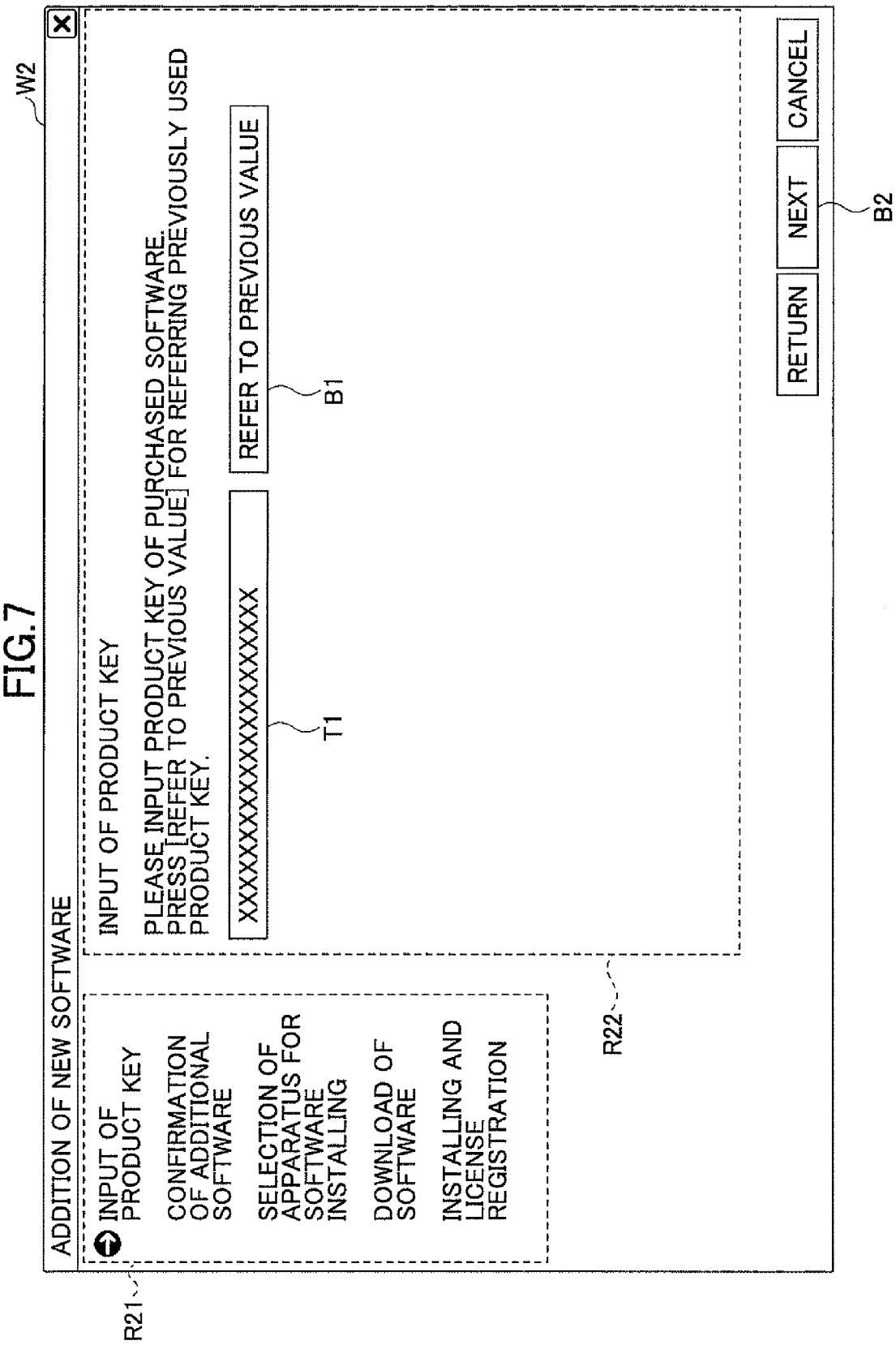

FIG.8

ADDITION OF NEW SOFTWARE — W3

R31:
- ● INPUT OF PRODUCT KEY
- ● CONFIRMATION OF ADDITIONAL SOFTWARE
- SELECTION OF APPARATUS FOR SOFTWARE INSTALLING
- DOWNLOAD OF SOFTWARE
- INSTALLING AND LICENSE REGISTRATION

● CONFIRMATION

THE FOLLOWING SOFTWARE IS INTRODUCED. OK?

| | |
|---|---|
| PACKAGE NAME | : PACKAGE 1 |
| PRODUCT KEY | : XXXXXXXXXXXXXXXXX |
| VENDOR NAME | : XXXXXXXXXX |
| LICENSE TYPE | : TIME-LIMITED LICENSE |
| THE NUMBER OF LICENSES | : 100/100 |

R32

[RETURN] [NEXT] [CANCEL] — B3

FIG.9

ADDITION OF NEW SOFTWARE

- INPUT OF PRODUCT KEY
- CONFIRMATION OF ADDITIONAL SOFTWARE
- SELECTION OF APPARATUS FOR SOFTWARE INSTALLING
- DOWNLOAD OF SOFTWARE
- INSTALLING AND LICENSE REGISTRATION

SELECTION OF APPARATUS FOR SOFTWARE INSTALLING
PLEASE SELECT APPARATUS TO INSTALL ADDITIONAL SOFTWARE FROM LIST. INSTALLING IS STARTED WHEN [NEXT] BUTTON IS PRESSED.

ADDITIONAL SOFTWARE : PACKAGE 1
THE NUMBER OF LICENSES : 100/100

APPARATUS LIST 100/100 | SELECT ALL | CANCEL ALL SELECTION

| | ADDRESS | MODEL NAME | LOCATION | COMMENT |
|---|---|---|---|---|
| ■ | XXX.XXX.XXX.XXX | MFP001 | 5F | |
| ■ | XXX.XXX.XXX.XXX | MFP002 | 5F | |
| ■ | XXX.XXX.XXX.XXX | MFP003 | 5F | |
| ■ | XXX.XXX.XXX.XXX | MFP004 | 5F | |
| ■ | XXX.XXX.XXX.XXX | MFP005 | 5F | |
| ■ | XXX.XXX.XXX.XXX | MFP006 | 4F | |
| ■ | XXX.XXX.XXX.XXX | MFP007 | 4F | |
| ■ | XXX.XXX.XXX.XXX | MFP008 | 4F | |
| ■ | XXX.XXX.XXX.XXX | MFP009 | 4F | |
| ■ | XXX.XXX.XXX.XXX | MFP010 | 4F | |
| ■ | XXX.XXX.XXX.XXX | MFP011 | 3F | |
| ■ | XXX.XXX.XXX.XXX | MFP012 | 3F | |

IMPORT FROM FILE [REFERENCE]
DIRECT INPUT [INPUT]

[RETURN] [NEXT] [CANCEL]

FIG.14

MANAGEMENT TOOL

MANAGEMENT TOOL
- IO APPARATUS LIST
- PRODUCT KEY LIST

PRODUCT KEY LIST

| SOFTWARE NAME (VERSION) | PRODUCT KEY | LICENSE TYPE | NUMBER OF LICENSES REMAINING /TOTAL | TERM OF VALIDITY | LATEST RENEWED DATE |
|---|---|---|---|---|---|
| PACKAGE 1(1.0) | XXXXXXXXXX | TRIAL | 5/10 | 2009/09/17 | 2009/08/17 |
| PACKAGE 2(2.0) | XXXXXXXXXX | TIME-LIMITED | 10/20 | 2009/09/22 | 2009/06/22 |
| PACKAGE 3(1.2) | XXXXXXXXXX | TIME-LIMITED | 5/10 | 2009/08/25 | 2009/06/25 |
| PACKAGE 4(1.4) | XXXXXXXXXX | TRIAL | 15/20 | 2009/10/17 | 2009/09/17 |
| PACKAGE 5(2.2) | XXXXXXXXXX | TIME-LIMITED | 7/10 | 2009/11/01 | 2009/08/01 |
| PACKAGE 6(1.0) | XXXXXXXXXX | TIME-LIMITED | 2/10 | 2009/12/23 | 2009/08/23 |
| PACKAGE 7(1.5) | XXXXXXXXXX | TIME-LIMITED | 12/25 | 2009/11/17 | 2009/05/17 |
| PACKAGE 8(1.0) | XXXXXXXXXX | TRIAL | 1/10 | 2009/09/17 | 2009/08/17 |
| ⋮ | | | | | |
| PACKAGE N(1.0) | XXXXXXXXXX | TIME-LIMITED | 5/10 | 2009/11/21 | 2009/07/21 |

FIG.16

SELECTION OF APPARATUS

SELECTION OF APPARATUS
PLEASE SELECT APPARATUS FOR SOFTWARE UNINSTALLING FROM LIST.

SOFTWARE TO BE UNINSTALLED: PACKAGE 1(1.0)
THE NUMBER OF LICENSES: 5/10

APPARATUS LIST
(SELECTED NUMBER: TOTAL OF 5 SETS) | SELECT ALL | CANCEL ALL SELECTION

| ADDRESS | MODEL NAME | MACHINE NUMBER | LOCATION | COMMENT |
|---|---|---|---|---|
| XXX.XXX.XXX.XXX | MFP001 | XXXXXX | 5F | |
| XXX.XXX.XXX.XXX | MFP002 | XXXXXX | 5F | |
| XXX.XXX.XXX.XXX | MFP003 | XXXXXX | 5F | |
| XXX.XXX.XXX.XXX | MFP004 | XXXXXX | 5F | |
| XXX.XXX.XXX.XXX | MFP005 | XXXXXX | 5F | |

[RETURN] [NEXT] [CANCEL]

FIG.18

UNINSTALLING/DEACTIVATION

WORK HAS BEEN FINISHED.

SOFTWARE TO BE UNINSTALLED: PACKAGE 1(1.0)
THE NUMBER OF LICENSES: X/10

APPARATUS LIST (SELECTED NUMBER: TOTAL OF 5 SETS)

| STATE | ADDRESS | MODEL NAME | MACHINE NUMBER | LOCATION | COMMENT |
|---|---|---|---|---|---|
| COMPLETED | XXX.XXX.XXX.XXX | MFP001 | XXXXXX | 5F | |
| COMPLETED | XXX.XXX.XXX.XXX | MFP002 | XXXXXX | 5F | |
| COMPLETED | XXX.XXX.XXX.XXX | MFP003 | XXXXXX | 5F | |
| ERROR | XXX.XXX.XXX.XXX | MFP004 | XXXXXX | 5F | |
| COMPLETED | XXX.XXX.XXX.XXX | MFP005 | XXXXXX | 5F | |

UNINSTALLING/DEACTIVATION OF SOFTWARE HAS BEEN COMPLETED.
XX/5

RETURN    NEXT    COMPLETE

INFORMATION PROCESSING APPARATUS, PROGRAM INTRODUCTION ASSISTANCE SYSTEM AND COMPUTER READABLE INFORMATION RECORDING MEDIUM

BACKGROUND OF THE INVENTION

1. Field of the Invention

The present invention relates to an information processing apparatus and a program introduction assistance system for installing and/or uninstalling of a program, and, in particular, to a technique of controlling a display screen page used at a time of assisting in introduction of a program to one or plural apparatuses that are connected via a predetermined data transmission path.

2. Description of the Related Art

Recently, mainly in a field of an image processing apparatus called a MFP (Multifunction Peripheral), there is such an image forming apparatus for which a new program may be developed after the shipment of the image processing apparatus, or a new program may be installed in the image processing apparatus after the shipment. In such a case, it is preferable that a license used for installing the program and/or using the program is provided to a user as being separated from the program itself and in such a manner suitable to a mode in which the user uses the program. Such a way of providing the license is convenient for the user, and also, by using such a way of providing the program, an extension of business opportunity of a party (manufacturer or such) who sells the program is expected.

For example, Japanese Laid-Open Patent Application No. 2008-243179 (Patent Document 1) discloses a technology for efficiently carrying out setting of a license for an application in plural apparatuses.

However, as a result of the program and the license being delivered separately, a procedure of introducing the program to the image processing apparatus may become complicated. That is, the user cannot actually use the program only by obtaining the program itself and installing the program in the image processing apparatus. Extra work of obtaining the license is necessary for actually using the program.

For example, in a case where the number of image processing apparatuses to which the program is to be installed is large, a necessary work load of the user may be increased a great amount. In a large-scale office environment, hundreds of image processing apparatuses have been introduced. In such an office environment, in a case where the program is introduced to these image processing apparatuses, it is preferable that the introduction of the program to these image processing apparatuses is carried out in one bundle. Further, in a case of carrying out the introduction of the program to these image processing apparatuses in one bundle, the user may wish to have various information items concerning the program introduction work such as progress in the program introduction processes, the program introduction results, and so forth.

SUMMARY OF THE INVENTION

According to one aspect of the present invention, an information processing apparatus that is connected with one or plural apparatuses via a predetermined data transmission path, includes a control part that controls a program introduction process that is carried out in each work stage of work of introducing a program to the one or plural apparatuses; a generation part that generates display screen pages corresponding to the work stages, based on a carrying out request of a user and/or carrying out results of the program introduction processes that have been carried out by the control part in response to the carrying out request; and a renewing part that renews the display screen page currently displayed on a display device of the information processing apparatus with the currently generated display screen page according to a renewing request of the generation part.

According to another aspect of the present invention, in a program introduction assistance system one or plural apparatuses and an information processing apparatus that carries out a program introduction process to introduce a program to the one or plural apparatuses are connected via a predetermined data transmission path. The program introduction assistance system includes a control part that controls the program introduction process in each work stage of the work of introducing the program to the one or plural apparatuses carried out by the information processing apparatus; a generation part that generates display screen pages corresponding to the work stages, based on a carrying out request of a user and/or carrying out results of the program introduction processes that have been controlled by the control part in response to the carrying out request; and a renewing part that renews the display screen page currently displayed on a display device of the information processing apparatus with the currently generated display screen page according to a renewing request of the generation part.

According to yet another aspect of the present invention, a computer readable information recording medium stores a display control program which is executed by a computer processor of an information processing apparatus that is connected with one or plural apparatuses via a predetermined data transmission path. The display control program, when executed by the computer processor, carries out controlling a program introduction process that is carried out in each work stage of the work of introducing a program to the one or plural apparatuses; generating display screen pages corresponding to the work stages, based on a carrying out request of a user and/or carrying out results of the program introduction processes that have been carried out by the control part in response to the carrying out request; and renewing the display screen pages of a display device of the information processing apparatus according to a renewing request.

Other objects, features and advantages of the present invention will become more apparent from the following detailed description when read in conjunction with the accompanying drawings.

BRIEF DESCRIPTION OF THE DRAWINGS

FIG. 7 shows an example of a product key input screen page according to the first embodiment of the present invention;

FIG. 8 shows an example of a license confirmation screen page according to the first embodiment of the present invention;

FIG. 9 shows an example of an installing apparatus selection screen page according to the first embodiment of the present invention;

FIG. 14 shows an example of a product key selection screen page according to the first embodiment of the present invention;

FIG. 16 shows an example of an uninstalling apparatus selection screen page according to the first embodiment of the present invention;

FIG. 18 shows an example of an uninstalling completion notification screen page according to the first embodiment of the present invention.

DETAILED DESCRIPTION OF THE EMBODIMENTS

Figure 1:
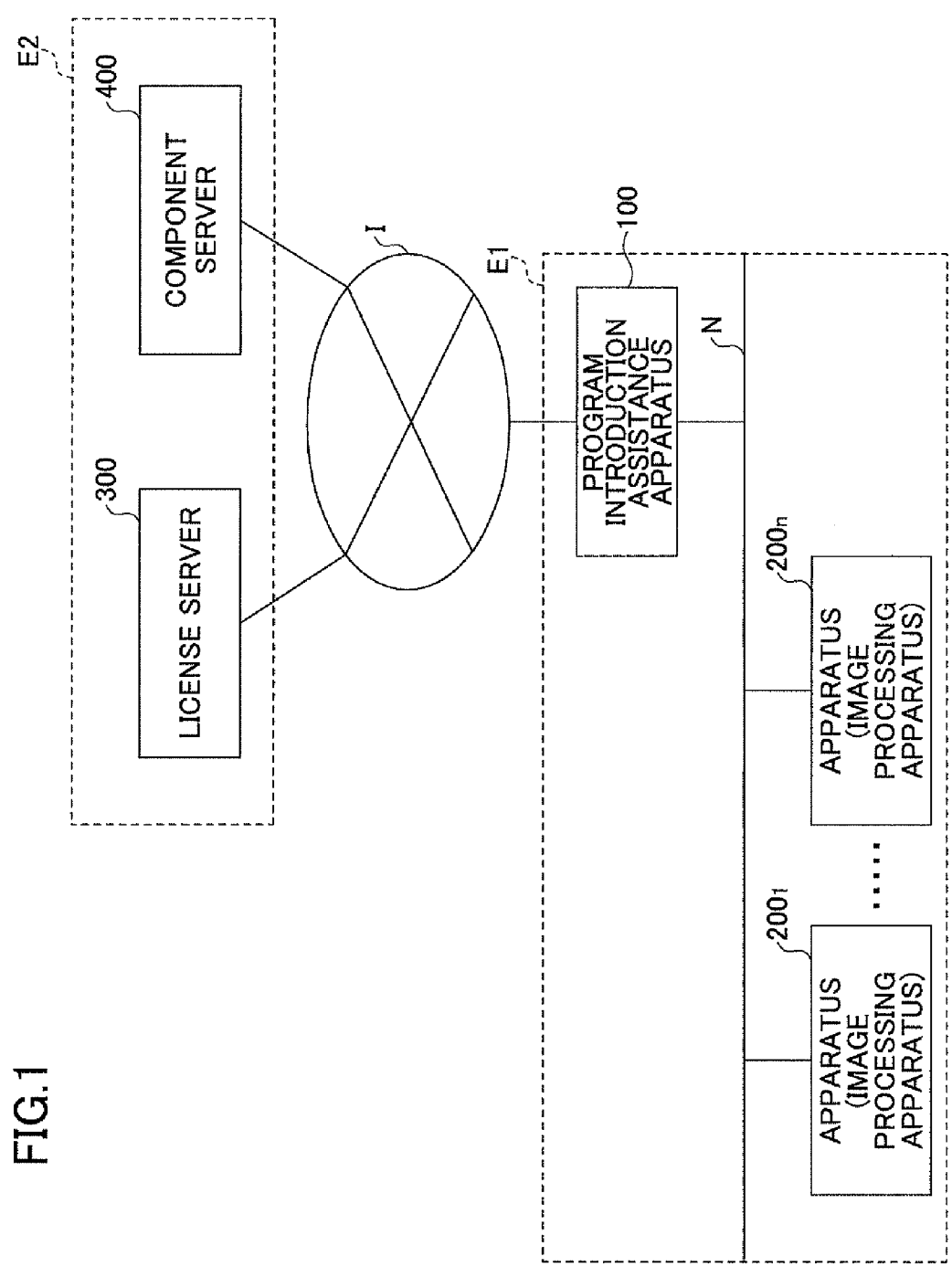
FIG. 1 shows an example of a configuration of a program introduction assistance system in a first embodiment of the present invention.

The first embodiment of the present invention has been proposed in consideration of the above-mentioned problem, and an object of the first embodiment of the present invention is to provide a program introduction assistance apparatus, a program introduction assistance system, a program introduction assistance method (display control method), a program introduction assistance program (display control program) and a computer readable information recording medium that stores the program introduction assistance program (display control program), which can assist in program introduction work appropriately by showing information of each work stage of the program introduction work to a user.

According to the first embodiment of the present invention, the program introduction assistance apparatus transfers a carrying out request that has been received from a display screen page (GUI: Graphical User. Interface), to a functional part that controls program introduction processes. The program introduction assistance apparatus stores screen page parts (Graphic Parts) for generating the display screen page, generates the display screen page showing information (a process situation, a process completion, or such) corresponding to each work stage by using the stored screen page parts, based on the received carrying out request or carrying out results of the program introduction processes carried out in response to the carrying out request, and renews the currently displayed display screen page with the currently generated display screen page.

Thereby, the program introduction assistance apparatus according to the first embodiment of the present invention can show to the user the information concerning the program introduction processes such as progress situations, carrying out results, and so forth, during the carried out work stages (in appropriate timing) by using the display screen pages. Thereby, the program introduction assistance apparatus can appropriately assist in the user's program introduction work.

Thus, according to the first embodiment of the present invention, it is possible to provide the program introduction assistance apparatus, a program introduction assistance system, a display control method, a display control program, and a computer readable information recording medium that stores the display control program, by which based on the user's carrying out request or the carrying out results of the program introduction processes carried out in response to the user's carrying out request, the display screen pages are generated corresponding to the work stages and the currently displayed display screen page is renewed with the currently generated display screen page. Thereby, it is possible to show to the user information of each work stage in the program introduction work to appropriately assist in the program introduction work.

Below, the first embodiment of the present invention will be described with reference to figures.

First Embodiment

System Configuration

A program introduction assistance system in the first embodiment will be described.

FIG. 1 shows an example of a configuration of the program introduction assistance system 1 in the first embodiment.

In the program introduction assistance system 1 of FIG. 1, a user environment E1 is a system environment of users who have introduced apparatuses $200_1$ through $200_n$ (which will be generalized as "apparatuses 200", hereinafter). For example, the user environment E1 corresponds to an enterprise or an office. In the user environment E1, the one or plural apparatuses 200 and the program introduction assistance apparatus 100 are connected by using an internal network N (which may be of a wired type or a wireless type) such as a LAN (Local Area Network). The apparatuses 200 are, for example, image processing apparatuses which realize plural functions such as a printing function, a scanning function, a copying function and a facsimile transmission/reception function, and are one example of electronic apparatuses. In the apparatuses 200, extension of functions is achievable as a result of one or plural components including programs and data for realizing extension of functions being added or renewed.

The program introduction assistance apparatus 100 is a PC (Personal Computer) that carries out obtaining, introduction and so forth, of components that operate in the apparatuses 200 in the user environment E1 and/or licenses (authority for use) of the components in one bundle, and the program introduction assistance apparatus 100 is one example of an information processing apparatus. It is noted that the user environment E1 may be plural user environments depending on the number of users (the number of users in an enterprise or in a unit of an office).

On the other hand, a manufacturer environment E2 is a system environment of a party who sells the components added to the apparatuses 200. For example, the manufacturer environment E2 is operated by a manufacturer of the apparatuses 200. The manufacturer environment E2 has a license server 300 and a component server 400.

The license server 300 is a license management apparatus that manages the licenses of the components purchased by the users. The component server 400 is a program management apparatus that manages substances of the components (one or plural programs).

It is noted that the user environment E1 and the manufacturer environment E2 are connected together by using an external network I such as the Internet.

In this system configuration, the program introduction assistance system 1 can carry out introduction of a program or obtaining a license in the apparatuses 200 in one bundle by using the program introduction assistance apparatus 100 for the user environment E1 even when many apparatuses 200 are introduced.

<Hardware Configuration>

Next, a hardware configuration of the program introduction assistance apparatus 100 will be described.

Figure 2:
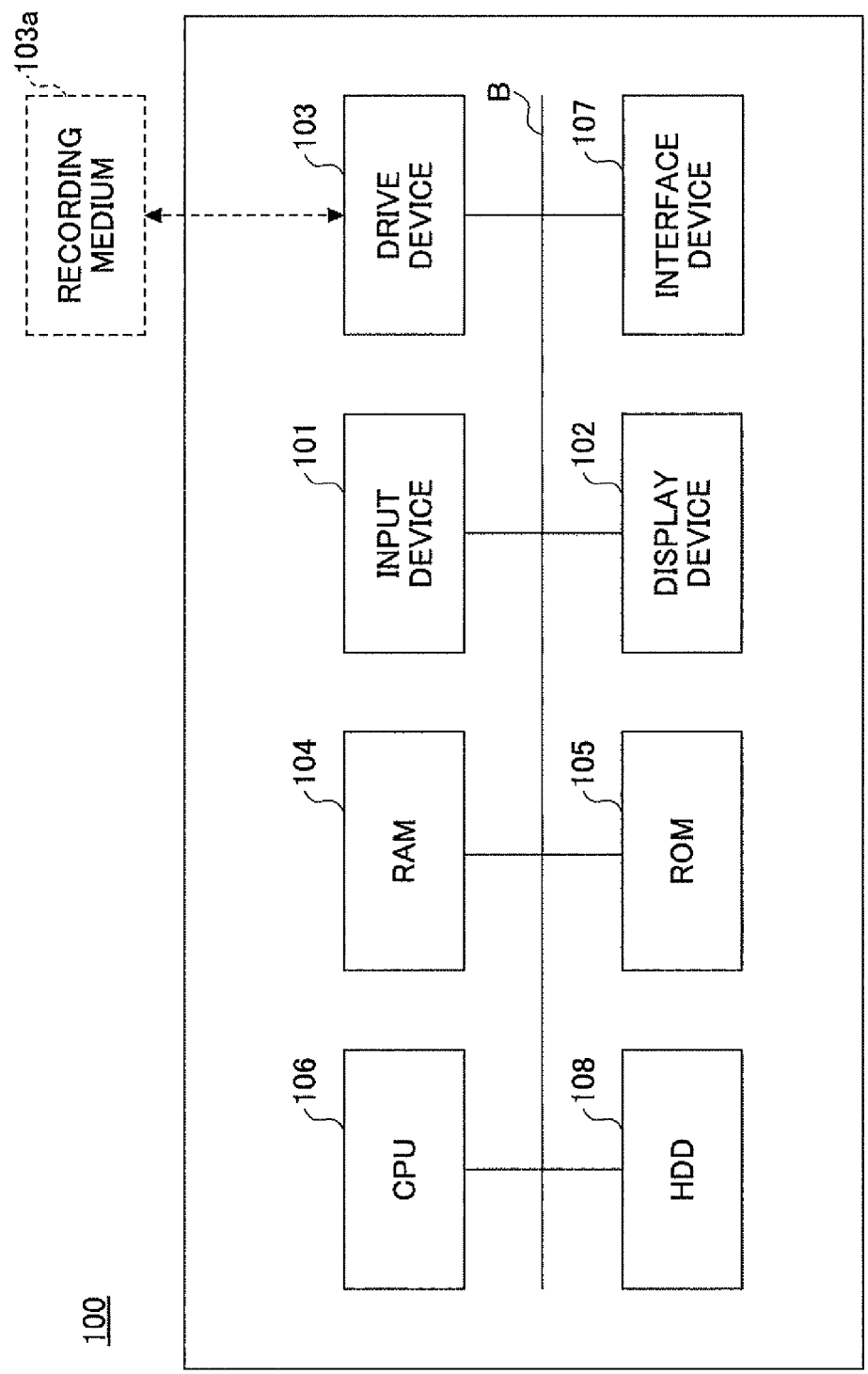
FIG. 2 shows an example of a hardware configuration of a program introduction assistance apparatus in the first embodiment of the present invention.

FIG. 2 shows an example of a hardware configuration of the program introduction assistance apparatus 100 in the first embodiment.

As shown in FIG. 2, the program introduction assistance apparatus 100 includes an input device 101, a display device 102, a drive device 103, a RAM (Random Access Memory) 104, a ROM (Read Only Memory) 105, a CPU (Central Processing Unit) 106, an interface device 107 and a HDD (Hard Disk Drive) 108, and these respective device are mutually connected by a bus B.

The input device 101 includes a keyboard and a mouse, and is used to input respective operation signals in the program introduction assistance apparatus 100. The display device 102 includes a display, and displays process results (for example, information concerning "process situations" and/or "carrying out results") of the program introduction assistance apparatus 100.

The interface device 107 is an interface that connects the program introduction assistance apparatus 100 with a predetermined transmission path (the internal/external networks). Therefore, the program introduction assistance apparatus 100 can carry out data communication with the apparatuses 200, the license server 300 and the component server 400 by using the interface device 107.

The HDD 108 is a non-volatile storage device that stores various programs and data. The programs and data stored in the HDD 108 include, for example, an information processing system (for example, an OS (Operating System) that is basic software such as "Windows" (registered trademark), "UNIX (registered trademark)" or such) which controls the entirety of the program introduction assistance apparatus 100, and applications (software) that provide various functions (for example, the "program introduction assistance function") in the information processing system. Further, the HDD 108 manages the stored programs and data by using a predetermined file system and/or a DB (database).

The drive device 103 is an interface for a detachable recording medium 103a. Thus, the program introduction assistance apparatus 100 can read from and/or write to the recording medium 103a by using the drive device 103.

The ROM 105 is a non-volatile semiconductor memory (storage device) that can hold internal data even after the power supply is stopped. The ROM 105 stores BIOS (Basic Input/Output System) executed when the program introduction assistance apparatus 100 is started up, data such as for a system construction and a network-related setting of the program introduction assistance apparatus 100, and so forth.

The RAM 104 is a volatile semiconductor memory (storage device) that temporarily holds programs or data read from the above-mentioned respective storage devices. The CPU 106 executes programs read to the RAM 104, and thereby, carries out control of the entirety of the program introduction assistance apparatus 100 and operations of various functions included in the program introduction assistance apparatus 100.

By the hardware configuration, in the program introduction assistance apparatus 100, for example, the CPU 106 executes programs (software components that realize functions included in the program introduction assistance apparatus 100) read from the HDD 108 to the RAM 104, and realizes the mounted functions.

As can be seen from the above-mentioned hardware configuration, the program introduction assistance apparatus 100 has a configuration approximately the same as an information processing apparatus such as a PC (Personal Computer).

<Program Introduction Assistance Function>

The program introduction assistance function according to the first embodiment will now be described.

Figure 3:
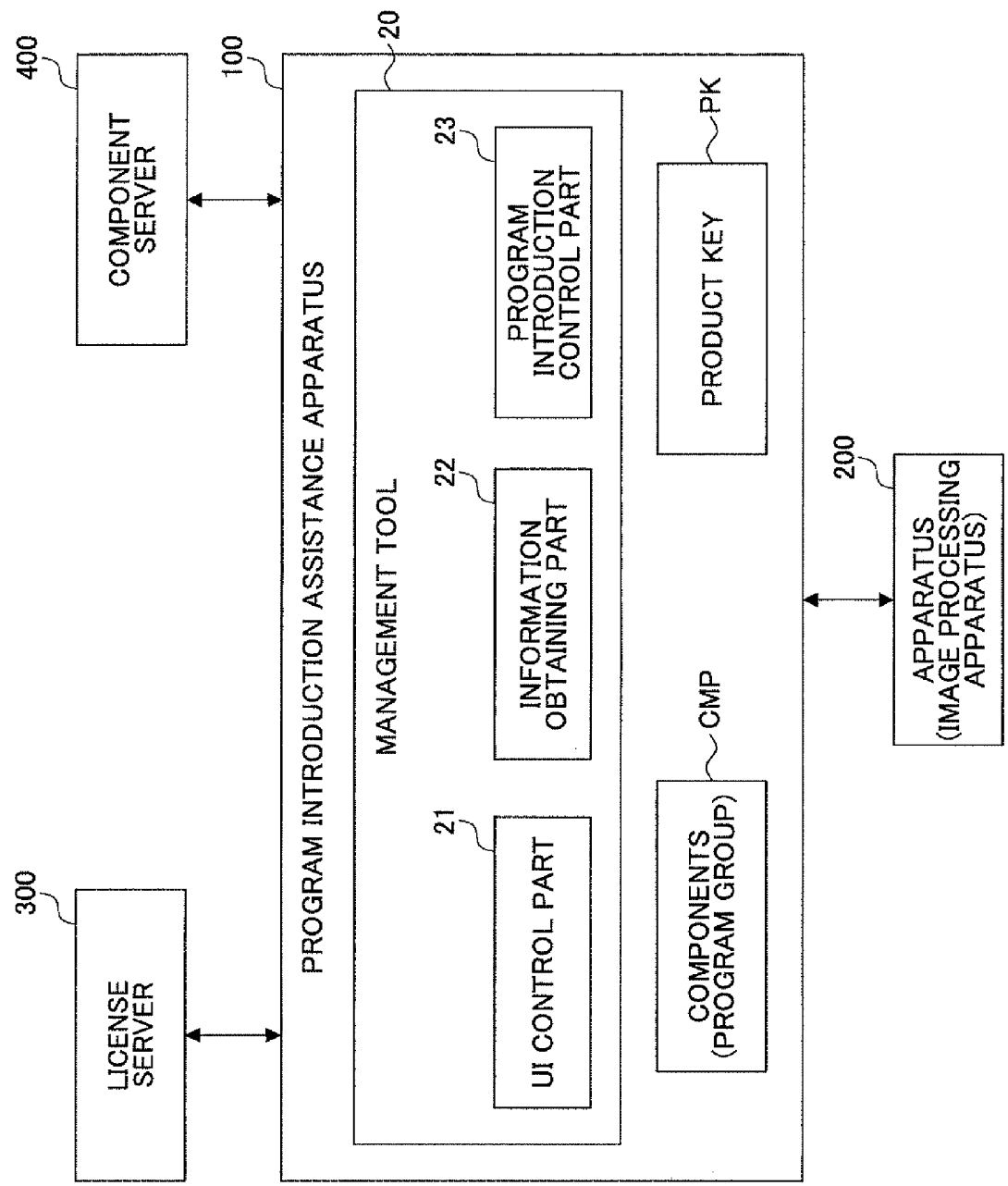
FIG. 3 shows an example of a configuration of a program introduction assistance function according to the first embodiment of the present invention.

FIG. 3 shows an example of a configuration of the program introduction assistance function according to the first embodiment.

As shown in FIG. 3, the program introduction assistance apparatus 100 has a management tool 20 as a main software configuration.

As described above, the management tool 20 is software that realizes the function of carrying out obtaining and introduction of the components that operate in the apparatuses 200 and/or licenses of the components in one bundle, i.e., the program introduction assistance function.

The program introduction assistance apparatus 100 carries out, for example, the following processes on the plural apparatuses 200 by means of the management tool 20 that has been started up.

The program introduction assistance apparatus 100 obtains components (program groups to introduce) CMP corresponding to product keys PK from the component server 400. The product keys PK used at this time are information items unique to respective packages attached to commercial software. The product keys PK are used by the manufacturer to manage registered users; also, for the purpose of avoiding unauthorized copying, input of the product key PK is required when the program is installed, and the program is prevented from being installed when the appropriate product key cannot be input. Therefore, from the program introduction assistance apparatus 100, the component CMP can be obtained in a case where the appropriate product key PI is input by the user to the management tool 20.

Further, the program introduction assistance apparatus 100 requests license authentication of the plural apparatuses 200 specified for program introduction from the license server 300. At this time, the program introduction assistance apparatus 100 transmits the product key PK input by the user and apparatus information obtained from the apparatuses 200 to the license server 300, and requests license authentication for each apparatus 200 from the license server 300. As a result, from the license server 300, licenses for the respective apparatuses 200 are issued, based on the product key PK and the apparatus information.

Thereby, the program introduction assistance apparatus 100 starts installing and activation of the program on the plural apparatuses 200 specified for program introduction.

The management tool 20 has a UI control part 21, information obtaining part 22 and a program introduction control part 23 as main functions of the program introduction assistance function for carrying out this program introduction process.

The UI control part 21 is a functional part that controls a GUI (Graphical User Interface) that receives a carrying out request sent to the management tool 20 or such and showing information of each work stage in the program introduction work. That is, the UI control part 21 controls the display screen page (a screen page displayed from the display device 102 of the program introduction assistance apparatus 100) used when the program is introduced for the purpose of assisting in the program introduction work. Details of the UI control part 21 will be described later in a description of the display control function.

The information obtaining part 22 is a functional part that obtains various information items necessary when the program is introduced, from the apparatuses 200 and the license server 300. For example, the information obtaining part 22 obtains apparatus information (for example, "machine numbers") necessary in license authentication from the apparatuses 200. Further, the information obtaining part 22 obtains package information necessary for determining the components CMP that are available based on the product keys PK from the license server 300. The package is a unit for a case where the component CMP in the first embodiment circulates in the market, and the package information is information concerning the package CMP in the circulating unit.

The program introduction control part 23 is a functional part that controls a process (referred to as a "program introduction process" hereinafter) carried out in each work stage of the program introduction work such as obtaining and introduction of the components CMP and the licenses. The program introduction control part 23 cooperates with the respective functional parts described above, and realizes introducing the programs in one bundle. For example, the program introduction control part 23 controls the program introduction process for each work stage according to the carrying out request received from the user by means of the UI control part 21, and transfers results (carrying out results) carried out according to the carrying out request to the UI control part 21. Further, the program introduction control part 23 carries out the program introduction process based on the information obtained by the information obtaining part 22.

<<Display Control Function>>

In the program introduction assistance function according to the first embodiment, the following display control function is realized by the management tool 20.

The management tool 20 transfers the carrying out request received by the UI control part 21 from the display screen page (GUI) to the program introduction control part 23. The management tool 20 stores screen page parts used to generate the display screen page, and the UI control part 21 generates the display screen page that shows information (process situations and/or process completions) corresponding to the work stages by using the screen page parts based on the received carrying out request and/or carrying out results of the program introduction processes carried out in response to the carrying out request, and renews the currently displayed display screen page with the currently generated display screen page. The management tool 20 has this display control function.

The program introduction work to introduce the program(s) to the apparatuses 200 is complicated as a result of the program(s) and the license(s) being separately delivered. Therefrom, in a case where the number of the apparatuses 200 for the program introduction is large, the user has a considerable work load. Therefore, it is preferred that the program introduction processes can be carried out in one bundle for the plural apparatuses 200. Further, in a case where the program introduction work is carried out in one bundle for the plural apparatuses 200, the user wishes to know various information concerning the program introduction work such as progress situations and carrying out results of the program introduction work.

Therefore, in the display control function according to the first embodiment, based on the user's carrying out request and/or the carrying out results of the program introduction processes carried out in response to the carrying out request, the display screen pages corresponding to the work stages are generated, and the currently displayed display screen page is renewed with the currently generated display screen page.

Thereby, in the program introduction assistance function according to the first embodiment, it is possible to show, to the user, information concerning the program introduction processes such as the progress situations and carrying out results during the work stages that are carried out (in appropriate timing), and thus, to appropriately assist in the user's program introduction work.

Below, a configuration and operations of the display control function will be described.

Figure 4:
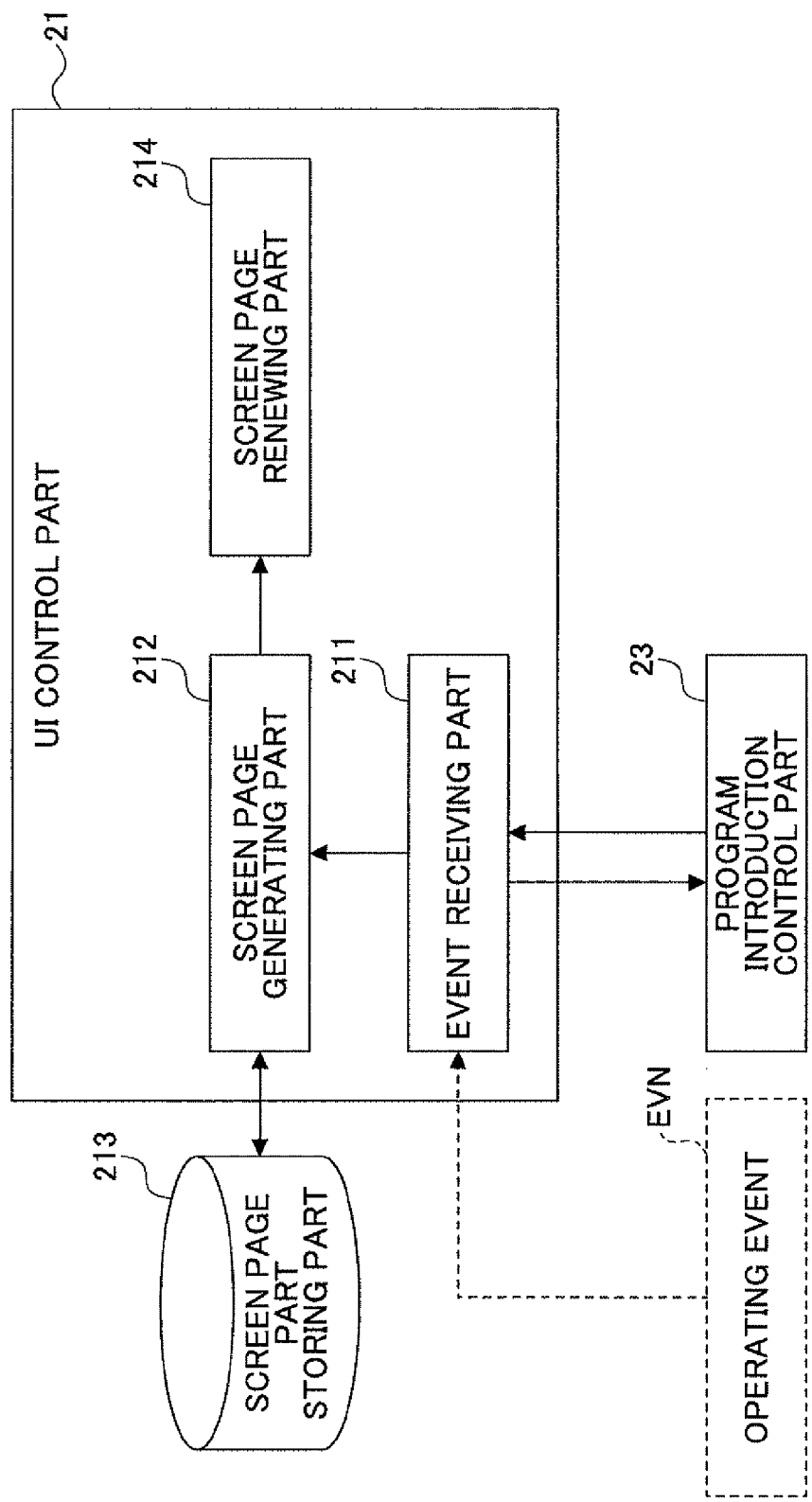
FIG. 4 shows an example of a configuration of a display control function according to the first embodiment of the present invention.

FIG. 4 shows an example of a configuration of the display control function according to the first embodiment.

As shown in FIG. 4, the display control function is realized by an event receiving part 211, a screen page generating part 212, a screen page part storing part 213 and a screen page renewing part 214. The event receiving part 211, the screen page generating part 212 and the screen page renewing part 214 are functional parts that the UI control part 21 has.

The event receiving part 211 is a functional part that receives the user's operating events received from the GUI of the display screen page, and receives/transmits various carrying out events from/to the program introduction control part 23. The operating events EVN that the event receiving part 211 receives may include, for example, the user's carrying out request and operation settings for the program introduction processes in the work stages. Further, the carrying out events that the event receiving part 211 receives/transmits may include, for example, the carrying out request received from the user and the process results (carrying out results) of the program introduction processes carried out in response to the carrying out request. That is, the program introduction control part 23 carries out the program introduction processes according to the carrying out request transferred from the event receiving part 211, and then, transfers the carrying out results to the event receiving part 211.

The screen page generating part 212 is a functional part that uses the one or plural screen page parts, and generates the display screen pages corresponding to the work stages of the program introduction work. The screen page parts are stored by the screen page part storing part 213. The screen page parts stored by the screen page part storing part 213 may include, for example, characters ("character strings of display information", for example), graphics ("selection area", "input area", "selection button" and so forth), and images ("background image" for example). The screen page storing part 213 may be realized by, for example, a predetermined storage area of a storage device (for example, HDD) that the program introduction assistance apparatus 100 has. The screen page parts are stored by the storage area when the software of the management tool 20 is installed in the program introduction assistance apparatus 100. The screen page generating part 212 refers to the screen page part storing part 213 when generating the display screen page, and obtains necessary ones of the screen page parts to generate the display screen page.

Further, the screen page generating part 212 generates the display screen pages based on the carrying out request received by the event receiving part 211 and/or the carrying out results of the program introduction processes carried out in response to the carrying out request, and requests the screen page renewing part 214 to renew the currently displayed display screen page with the currently generated display screen page. According to the request from the screen page generating part 212, the screen page renewing part 214 renews the currently displayed display screen page with the currently generated display screen page.

The screen page generating part 212 generates the following display screen pages.

The screen page generating part 212 generates a starting-up screen page that notifies the user of start of a service concerning program instruction assistance, when the management tool 20 is started up.

Further, when receiving a carrying out request from the event receiving part 211, the screen page generating part 212 generates a screen page that shows information concerning program introduction processes to be carried out according to the carrying out request. For example, when receiving a carrying out request for a work stage, the screen page generating part 212 generates a setting screen page that requests the user to input operation settings in a case where the program introduction process to be carried out in the work stage requires the operation settings.

Further, when receiving a carrying out result of a program introduction process from the event receiving part 211, the screen page generating part 212 generates a screen page that shows information concerning the program introduction process that is currently carried out. For example, when receiving a carrying out result, the screen page generating part 212 generates a notification screen page that notifies the user of a process situation of the program introduction process or a confirmation screen page for confirming the carrying out result of the program introduction process. Further, when receiving a process completion notification, the screen page generating part 212 generates a notification screen page that notifies the user of the completion of the program introduction process.

Thus, in the display control function, the screen page generating part 212 shows, to the user, information concerning program introduction processes such as progress situations and carrying out results, during carried out work stages. That is, by the display control function, it is possible to show, to the user, information (desired by the user) necessary in assisting in the program introduction work in appropriate timing, as a result of the screen page generating part 212 of the UI control part 21 and the program introduction control part 23 cooperating.

Thus, the display control function according to the first embodiment is realized as a result of the above-mentioned respective functional parts cooperating.

Next, detailed operations of the display control function (cooperating operations of the functional part group) will be described with reference to a sequence diagram that shows the program introduction processes.

The display control function in program introduction assistance is realized as a result of a program (a software component concerning the display control function) mounted (installed) in the program introduction assistance apparatus 100 being read by the CPU 106 from a storage destination (for example, "ROM") to the RAM 104, and the following processes being carried out by the CPU 106.

The program introduction processes according to the first embodiment may be roughly classified into "installing and activation process" and "uninstalling and deactivation process". Below, these respective processes are described in sequence, and also, display control processes that cooperate with the above-mentioned processes will be described together.

<<Installing and Activation Process>>

Figure 5:
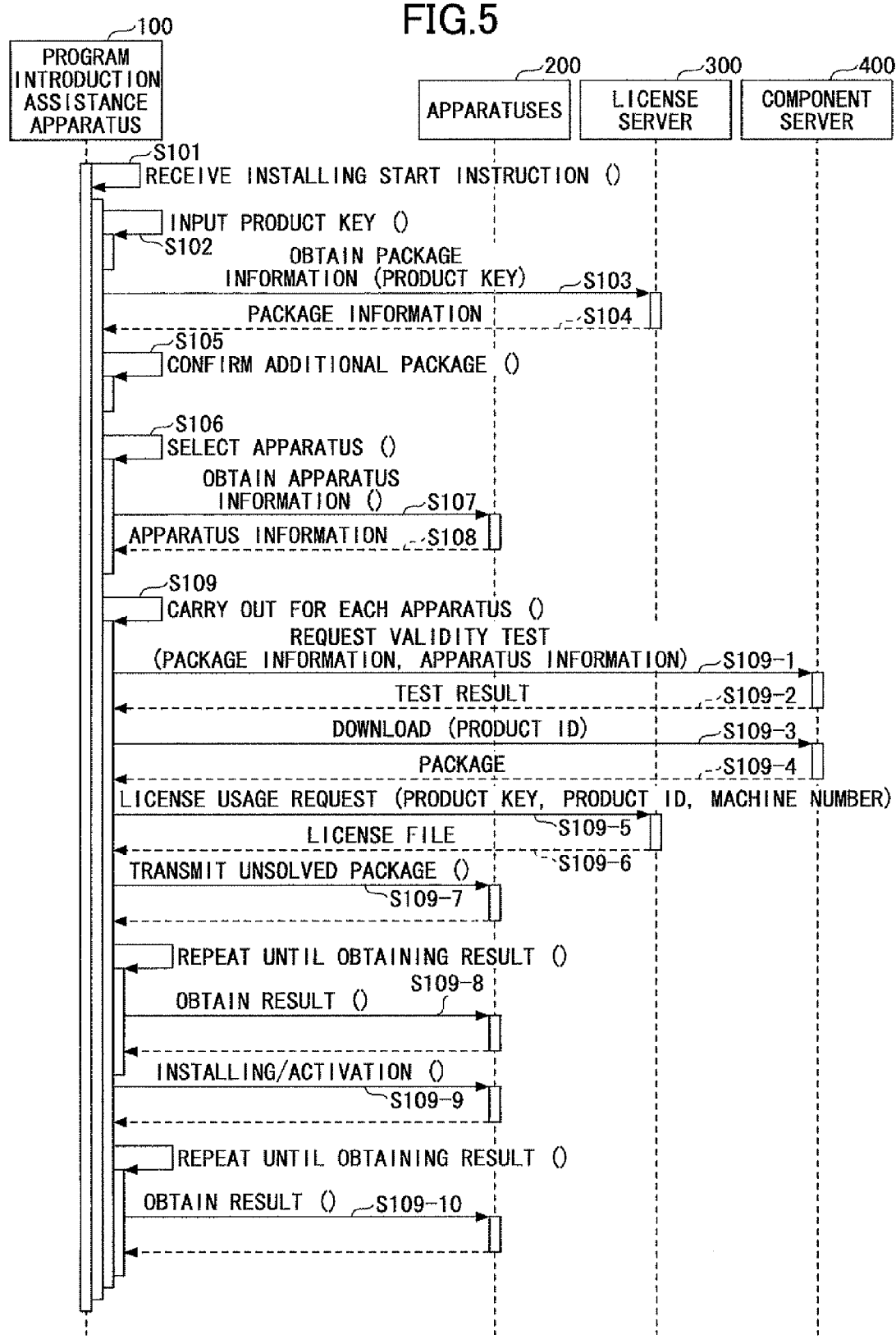
FIG. 5 is a sequence diagram showing an example of a procedure of an installing and activation process according to the first embodiment of the present invention.

FIG. 5 shows a sequence diagram that shows an example of the installing and activation process according to the first embodiment. In FIG. 5, it is assumed that the user of the apparatuses 200 purchased any commercial product concerning a selling package, and obtained a product key PK of the commercial product. The "selling package" means a circulation unit of a component. The selling package may circulate in a form of plural selling packages.

Further, the product key PK is an identifier (unique information) uniquely issued (or assigned) each time a commercial product is purchased. The product key PK is used as information (license identifier) for identifying a license (authority for use) for a selling package included in the commercial product, and also, is used as information for authenticating that the user is an authorized purchaser. It is noted that in the first embodiment, a product ID and a product key PK are clearly distinguished therebetween. That is, the product ID is used for identifying the selling package as the commercial product, while the product key PK is used for identifying an action of purchasing the commercial product. Therefore, the different product key PK is issued each time the commercial product having the same product ID is purchased.

It is noted that a specific mode of purchasing the commercial product is not limited to a predetermined mode. The commercial product may be purchased via a sales transaction at the store, or may be purchased via an electronic sales transaction (for example, "by using a Web site"). In the former case, generally speaking, the product key PK is attached to a CD (Compact Disk) or such that stores the selling package. In the latter case, the product key may be displayed on a Web page when the transaction is fixed in the Web site from which the commercial product has been purchased, or may be sent via an electronic mail. In FIG. 5, such a scenario is assumed that the user carries out installing and activation (obtaining a license) concerning the selling package concerning the purchased commercial product by using the program introduction assistance apparatus 100 for each apparatus 200.

Below, the display control process that is carried out in the installing and activation process will be described.

Figure 6:
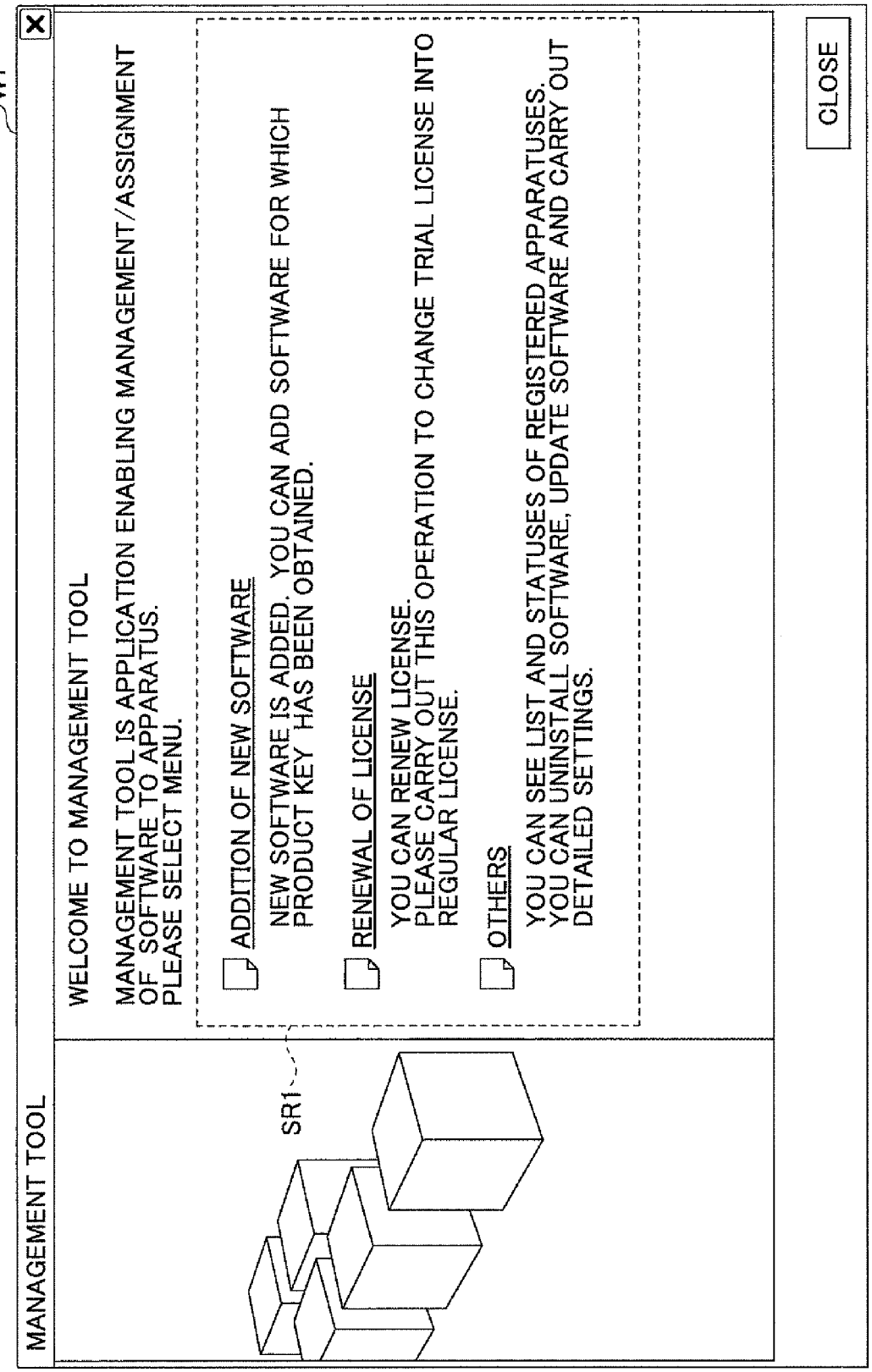
FIG. 6 shows an example of a management tool starting-up screen page according to the first embodiment of the present invention.

In the program introduction assistance apparatus 100, when the management tool 20 is started up, the screen page generating part 212 of the UI control part 21 displays a starting-up screen page, for example, as shown in FIG. 6, on the display device 102.

FIG. 6 shows an example of the starting-up screen page of the management tool 20 according to the first embodiment.

FIG. 6 shows the example of the starting-up screen W1 from which the user can select various services that are provided by the management tool 20 to the user and assist in program introduction.

The starting-up screen page W1 mainly includes a comment field that explains the management tool 20 and the selection area SR1 from which the user can select the above-mentioned various services. In the example of the screen page shown in FIG. 6, the services of "addition of new software", "renewal of license", and "others" can be selected from the selection area SR1. The service "others" includes, for example, free update, uninstalling (deletion of software) and obtaining result information.

In the UI control part 21, the screen page generating part 212 refers to the screen page parts that the screen page part storing part 213 stores, and generates the above-mentioned starting-up screen page W1. For example, the screen page generating part 212 uses various screen page parts such as characters to explain the application to be displayed in the comment field and characters to show the service selection menu to be displayed in the selection area SR1, and generates the above-mentioned starting-up screen page W1. Then, the screen page renewing part 214 renews the screen page currently displayed on the display device 102 with the thus-generated starting-up screen page W1 in response to a screen page renewing request given by the screen page generating part 212.

The program introduction assistance apparatus 100 receives a service operation request for a service that the user desires from the starting-up screen page W1, i.e., the program introduction assistance apparatus 100 receives a program introduction work request as an operating event EVN. Hereinafter, a process for a case where "addition of new software" is selected from the stating-up screen page W1 will be described with reference to FIG. 5.

In the UI control part 21, when the event receiving part 211 has received the user's input of the selling package installing start instruction (operating event EVN) from the starting-up screen page W1, the screen page generating part 212 causes the display device 102 to display a product key input screen page (step S101).

FIG. 7 shows an example of the product key (PK) input screen page according to the first embodiment.

FIG. 7 shows the example of the product key input screen page (setting screen page) W2 with which the management tool 20 urges the user to input a product key PK corresponding to the selling package (component) to be installed.

The input screen page W2 of FIG. 7 mainly includes a work stage information reporting field R21 that shows information concerning work stages of the requested program introduction work and a progress situation of each work stage; and a program introduction process information field R22 that shows information concerning the program introduction process currently carried out in the work stages. In the example shown in FIG. 7, the work stage information field R21 shows a progress situation that the work has proceeded to the stage of "input of product key". Further, the program introduction process information field R22 urges the user to input the product key PK. From a text box T1 of the program introduction process information field R22, the user can input the product key PK. Further, the user can input the product key PK by using file designation (import) by pressing a [refer to previous value] button B1 of the program introduction process information field R22.

In the UI control part 21, when the event receiving part 211 has received the installing start instruction, the screen page generating part 212 refers to the screen page parts that the screen page part storing part 213 has, and generates the above-mentioned input screen page W2. For example, the screen page generating part 212 uses the respective screen page parts such as the work item characters "input of product key" to be displayed in the work stage information field R21, and the text box T1 and the [refer to previous value] button B1 to be displayed in the program introduction process information field R22, and generates the above-mentioned input screen page W2. Then, the screen page renewing part 214 renews the currently displayed starting-up screen page W1 on the display device 102 with the currently generated input screen page W2, in response to a screen page renewing request given by the screen page generating part 212.

The UI control part 21 receives the input of the product key PK as a result of a "next" button B2 in the input screen page W2 being pressed by the user.

Returning to the description of FIG. 5, when the product key PK of the selling package to be installed (referred to as "current selling package", hereinafter) is input from the input screen page W2 (step S102), the UI control part 21 transfers the input product key PK to the program introduction control part 23.

The program introduction control part 23 requests the information obtaining part 22 to obtain package information concerning the product key PK. As a result, the information obtaining part 22 transmits a package information obtaining request to the license server 300 for the package information concerning the product key PK with designating the product key PK (step S103).

In response to receiving the package information obtaining request, the license server 300 determines the validity of the product key PK designated in the package information obtaining request. For example, the license server 300 refers to a license management table, and determines the validity of the designated license key PK.

The license management table has items such as, for each license issued for the selling package, a management number (record identifier), a product key PK, a product ID, a machine number (apparatus identifier), a status (license state information), a license mode (contract mode information), license term of validity, license issued date, and so forth. From these items, the management number, the product key, the product ID, the status and the license mode are recorded in the license management table when the commercial product is purchased. On the other hand, the machine number, the license term of validity, and the license issued date are recorded in response to the issuance of the license (i.e., the issuance of the license file). Further, in response to the issuance of the license, the value of the status is renewed.

The license server 300 determines the validity of the product key PK as follows: For example, the license server 300 determines that the product key PK is valid in a case where the record including the received product key PK has been registered in the license management table, the status of the record including the product key PK is not "check out", and also, the license term of validity of the record including the product key PK has not exceeded the present time (or the license term of validity has not been registered). Otherwise, the license server determines that the product key PK is not valid.

In a case where having determined that the product key PK is not valid, the license server 300 transmits error information indicating that the product key PK is not valid to the program introduction assistance apparatus 100 as a response. In this case, in the program introduction assistance apparatus 100, the received error information is transferred to the UI control part 21 from the program introduction control part 23. Thereby, in the UI control part 21, the screen page generating part 212 generates a display screen page based on the received error information that has been received from the event receiving part 211, and the screen page renewing part 214 renews the currently displayed display screen page with the thus-generated display screen page. Thus, the installing work is discontinued.

On the other hand, in a case of having determined that the product key PK is valid, the license server 300 transmits the information (package information) included in the record concerning the received product key PR to the program introduction assistance apparatus 100 as a response (step S104). Therefore, the package information includes at least the product ID (i.e., the product ID of the current selling package) associated with the product key PK. Further, in a case where the product key PK is of a group license or a volume license, the package information includes plural product IDs (plural records).

In the program introduction assistance apparatus 100, the received package information is transferred from the program introduction control part 23 to the UI control part 21.

In the UI control part 21, a confirmation screen page (license confirmation screen page) including the package information received from the event receiving part 211 is displayed on the display device 102, and the user is thus urged to confirm the contents of the current selling package and the contents of the license thereof (step S105).

FIG. 8 shows an example of the license confirmation screen page according to the first embodiment.

FIG. 8 shows the example of the license confirmation screen page W3 with which the management tool 20 urges the user to confirm the contents of the license.

The confirmation screen page W3 has, the same as the above-mentioned input screen page W2, a work stage information field R31 and a program introduction process information field R32. In the example of the screen page shown in FIG. 8, the work stage information field R31 shows a progress situation where the stage of "input of product key" has been finished and the stage of "confirmation of additional software" is proceeded with. Further, the program introduction process information field R32 shows information to urge the user to confirm the contents of the current selling package and shows the contents of the current selling package, i.e., "package name", "product key" and "vendor name", and the contents of the license, i.e., "license type" and "the number of licenses". The "license type" may be, for example, a regular license, a volume license, a group license, a time-limited license, a trial license, or such. "The number of licenses" includes the number of remaining licenses and the total number of licenses.

In the UI control part 21, when the event receiving part 211 receives the information obtaining result (a result of carrying out obtaining the package information) of the in obtaining part 212 from the program introduction control part 23, the screen page generating part 212 reads the screen page parts that the screen page part storing part 213 has, and generates the above-mentioned confirmation screen page W3. For example, the screen page generating part 212 uses the respective screen page parts such as the stage item characters "confirmation of additional software" to be displayed in the work stage information field R31 and the item characters "package name", "product key", "vendor name", "license type", "the number of licenses" and so forth, and generates the above-mentioned confirmation screen page W3. At this time, the screen page generating part 212 receives the package information obtained by the information obtaining part 22 from the program introduction control part 23 via the event receiving part 211, and generates each item value (display contents) of the above-mentioned program introduction process information field R32.

Then, the screen page renewing part 214 renews the input screen page W2 of the display device 102 with the confirmation screen page W3 in response to a screen page renewing request given by the screen page generating part 212.

The UI control part 21 receives information that the user has confirmed the contents (installing work continuation instruction) as a result of a [next] button B3 of the confirmation screen page W3 being pressed by the user.

Returning to the description of FIG. 5, in the UI control part 21, when the event receiving part 211 has received the input of the installing work continuation instruction (operating event) from the confirmation screen page W3, the screen page generating part 212 causes the display device 102 to display a selection screen page including the list of the apparatuses 200, and urges the user to select the apparatuses 200 in which the current selling package is to be installed (step S106).

FIG. 9 shows an example of the selection screen page for the installing apparatuses 200 according to the first embodiment.

FIG. 9 shows the example of the selection screen page (setting screen page) W4 from which the management tool 200 urges the user to select the apparatuses 200 for installing.

The selection screen page W4 includes, the same as the confirmation screen page W3, a work stage information field R41 and a program introduction process information field R42. In the example of the screen page shown in FIG. 9, the work stage information field R41 shows a progress situation that the stage of "confirmation of additional software" has been finished and the stage of "selection of apparatus for software installing" is proceeded with. The program introduction process information field R42 shows information to urge the user to select the apparatuses to have software installed, and information for confirming the contents of the selling package to be installed "additional software (package name)" and the contents of the license "the number of licenses". It is noted that the "the number of licenses" is information obtained from a carrying out result of the package information obtaining process (steps S103, S104) carried out by the information obtaining part 22. That is, "the number of licenses" includes the number of remaining licenses and the total number of licenses.

Further, the program introduction process information field R42 shows the apparatus list having items such as "address", "model name", "location", "comment" and so forth of the apparatuses 200 in a selection area SL14, and the user can select the apparatuses 200 to have the software installed therefrom. It is noted that in the selection area SL4, the apparatuses 200 (apparatuses for which apparatus information has been stored) for which the IP addresses, the host names and so forth have been already stored in a storage device (for example, "HDD") that the program introduction assistance apparatus 100 has are to be displayed. Alternatively, the information obtaining part 22 may dynamically search for the apparatuses 200 connected to the internal network N by carrying out broadcast transmission to the internal network N, and displays the thus-obtained host names and so forth of the apparatuses 200.

In the program introduction process information field R42, the user may press a check box ☐ (☐→■) to select the apparatuses 200 to have the software installed. Further, in the program introduction process information field R42, the user may press a [select all] button to select all the apparatuses 200 displayed in the selection area SL4. On the other hand, the user may press a [cancel all selection] button to cancel all the selections of the apparatuses 200. Further, in the program introduction process information field R42, the user may press a [reference] button to input the apparatuses 200 by using file designation (import). Further, in the program introduction process information field R42, in the selection area SL4, it is possible to select the plural apparatuses 200 into each of which the software is to be installed.

In the UI control part 21, when the event receiving part 211 receives the installing work continuation instruction (operating event), the screen page generating part 212 refers to the screen page parts that the screen page part storing part 213 stores, and generates the above-mentioned selection screen page W4. For example, the screen page generating part 212 uses the respective screen page parts such as stage item characters "selection of apparatus for software installing" to be displayed in the work stage information field R41, item characters "additional software (package name)", "the number of licenses" and "apparatus list", the selection area SL4, the [select all] button, the [cancel all selection] button, and so forth, to be displayed in the program introduction process information field R42, and generates the above-mentioned selection screen page W4. At this time, the screen page generating part 212 receives the package information obtained by the information obtaining part 22 from the program introduction control part 23 via the event receiving part 211, and generates the respective items (display contents) of the above-mentioned program introduction process information field R42. Further, the screen page generating part 212 generates the respective items (display contents) of the above-mentioned selection area SL4 based on the stored apparatus information.

Then, the screen page renewing part 214 renews the confirmation screen page W3 of the display device 102 with the selection screen page W4 according to a screen page renewing request given by the screen page generating part 212. It is noted that the above-mentioned program introduction process information field R42 displays, as the item value of the item characters "apparatus list", the number of the apparatuses that have been selected by the user. This number of the apparatuses that have been selected by the user is renewed according to the number of the apparatuses selected by the user, by means of the above-mentioned screen page generating and screen page renewing processes.

The UI control part 21 receives the designation request (selection information) for designating (selecting) the apparatuses for software installing as a result of a [next] button B4 in the selection screen page W4 being pressed by the user.

The program introduction assistance apparatus 100 transfers the received selection information that the apparatuses for software installing have been selected, from the UI control part 21 to the program introduction control part 23. Returning to the description of FIG. 5, the program introduction control part 23 requests the information obtain part 22 to obtain the apparatus information of the apparatuses for software installing based on the above-mentioned selection information. As a result, the information obtaining part 22 transmits a request for obtaining the apparatus information to the respective apparatuses 200 selected as the apparatuses for software installing (step S107).

Each apparatus 200 having received the request for obtaining the apparatus information obtains information stored in an installing information management table, and transmits information including the thus-obtained information and the machine number of the apparatus 200 to the program introduction assistance apparatus 100 as the apparatus information as a response (step S108).

In the installing information management table, for each selling package or firmware installed in the apparatus 200, the product ID (a list of product IDs of functional packages belonging to the selling package), the version, the product ID of the functional package, an activation flag (whether the product has been activated), the term of validity and so forth are registered. The contents of the installing information management table are registered when the selling package is installed as described later. It is noted that the apparatus information transmitted as the response in step S108 includes all the information registered in the installing information management table.

In the program introduction assistance apparatus 100, in step S108, during the above-mentioned apparatus information being obtained from each apparatus 200, the UI control part 21 displays a notification screen page to notify the user of this operation of the apparatus information being obtained.

Figure 10:
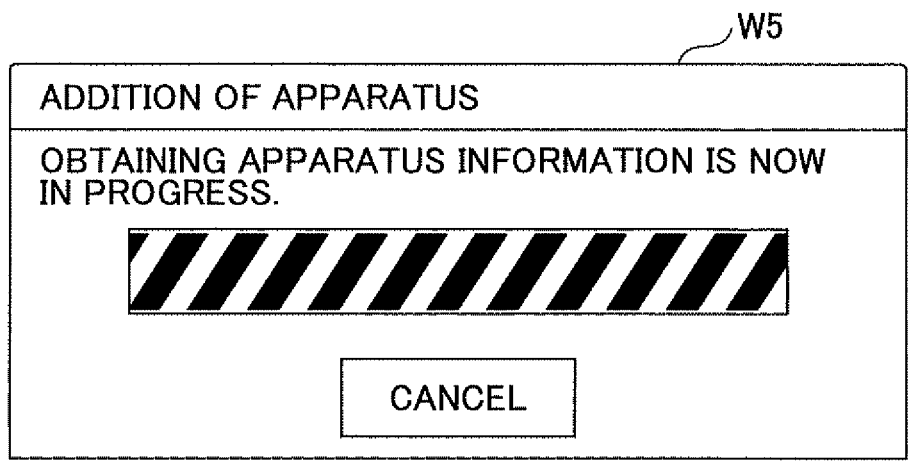
FIG. 10 shown an example of an apparatus information obtaining notification screen page according to the first embodiment of the present invention.

FIG. 10 shows an example of the notification screen page to report the apparatus information being obtained according to the first embodiment.

In FIG. 10, the example of the notification screen page W5 notifying the user that the management tool 20 is now obtaining the apparatus information from each apparatus 200 is shown.

The UI control part 21 generates the notification screen page W5 based on a situation (a carrying out result) of the information obtaining part 22 obtaining the apparatus information, received from the program introduction control part 23 via the event receiving part 211.

Then, the screen page renewing part 214 renews the display screen page of the display device 102 according to a screen page renewing request given by the screen page generating part 212.

Thus, the program introduction assistance apparatus 100 can notify the user of the progress situation of the process of obtaining the apparatus information from the apparatuses 200 for software installing.

It is noted that from the notification screen page W5, the user can discontinue the process of obtaining the apparatus information by pressing a [cancel] button.

Returning to the description of FIG. 5, the subsequent step S109 is a loop process carried out for each apparatus 200 (selected from the selection screen page) for which the apparatus information has been thus obtained. The apparatus 200 currently processed in the loop process will be referred to as a "current apparatus", hereinafter.

In the program introduction assistance apparatus 100, the program introduction control part 23 transmits a validity test request including the apparatus information of the current apparatus and the obtained package information to the component server 400 (step S109-1). "Validity" is validity of installing the functional package included in the current selling package in the current apparatus. In response to receiving the validity test request, the component server 400 verifies the validity of installing the functional package in the current apparatus. For example, the component server 400 refers to a dependency management table and determines the validity.

In the dependency management table, for each functional package, the product ID of the functional package and the product ID of a functional package or firmware (the depending target of the functional package) on which the functional package depends are registered.

The component server 400 determines the validity as follows: For example, the component server 400, first in the validity test, obtains the list of product IDs of functional packages belonging to the current selling package from a package management table. In the package management table, for each selling package, the product ID, the version, the product ID of the functional package, and so forth, are registered. Next, the component server 400 determines a functional package (referred to as "depending target package", hereinafter) on which the functional package depends, based on the obtained product ID of each functional package and the dependency management table.

In a case where the depending target package exists, the component server 400 determines whether the product ID of the depending target package is included in the apparatus information. In a case where the product IDs of all the depending target packages are included in the apparatus information, the component server 400 determines that the validity exists. In a case where at least one depending target package (referred to as "unsolved package", hereinafter) not included in the apparatus information exists, the component server 400 determines that the validity does not exist. It is noted that plural depending target packages may exist for one functional package. Further, search for the dependency is carried out recursively.

Next, the component server 400 transmits the validity test result to the program introduction assistance apparatus 100 as a response (step S109-2). In a case where the validity does not exist, the validity test result includes the product ID of the unsolved package.

Next, in the program introduction assistance apparatus 100, the program introduction control part 23 transmits a download request to the component server 400 with designating the product ID of the current selling package (step S109-3).

The component server 400 obtains the selling package corresponding to the designated product ID from a storage device (for example, "HDD") of the component server 400, and transmits the obtained selling package to the program introduction assistance apparatus 100 as a response (step S109-4). In a case where the current selling package is plural selling packages, the download (steps S109-3 and S109-4) is repeated plural times. Further, in a case where the test result that the validity does not exist is received in step S109-2, the download is carried out even for the unsolved package. It is noted that the case where the current selling package is plural selling packages is a case where the product key PK input in step S101 is of a group license, plural product keys PK have been input, for example.

Next, in the program introduction assistance apparatus 100, the program introduction control part 23 transmits a license usage request with designating the product key PK input in step S101, the product ID of the current selling package and the machine number of the current apparatus to the license server 300 (step S109-5).

The license server 300 generates a license file based on the information included in the received license usage request and the license management table, and transmits the generated license file to the program introduction assistance apparatus 100 as a response (step S109-6).

The license file includes the product ID (the product ID of the selling package for which usage has been allowed), the machine number (the machine number of the apparatus for which usage has been allowed) and the term of validity (the term of validity of the license).

It is noted that in the program introduction assistance apparatus 100, in a case where the processes of the steps S109-3 and S109-4 (download of the selling package) have been successfully carried out, the program introduction control part 23 carries out step S109-5. That is, in a case where the selling package could not normally be obtained, the program introduction control part 23 does not carry out obtaining the license file. This is why in a case where the selling package could not be obtained, it is not possible to install the selling package. If the license file of the selling package is obtained although the selling package could not be obtained, usage of the license is started for the selling package that is not actually used. This results in the user's disadvantage. In order to avoid the situation, the license is not obtained for the selling package that could not be obtained.

Next, in the program introduction assistance apparatus 100, the program introduction control part 23 transmits the unsolved package to the current apparatus and requests the current apparatus to install the unsolved package (step S109-7), in a case where the unsolved package has been obtained in step S109-4. As a result, in the current apparatus, the unsolved package is installed, and the information (for example, "product ID") of the unsolved package is stored in the installing information management table.

Next, in the program introduction assistance apparatus 100, the program introduction control part 23 queries the current apparatus for an installing result of the unsolved package (step S109-8). This querying (polling) is repeated until the installing has been completed in the current apparatus and the installing result is transmitted as a response.

The unsolved package is thus first installed for the purpose of avoiding a failure of installing the selling package otherwise occurring because the component CMP that is the depending target has not been installed yet.

Next, in the program introduction assistance apparatus 100, the program introduction control part 23 transmits the selling package (current selling package) obtained in step S109-4 and the license file obtained in step S109-6 to the current apparatus, and requests the current apparatus to install and activate the selling package (step S109-9). As a result, in the current apparatus, the selling package is installed, and the information of the selling package (for example, "product ID") of the selling package is stored in the installing information management table. Further, in the current apparatus, the license file is stored in a predetermined storage area.

Next, in the program introduction assistance apparatus 100, the program introduction control part 23 queries the current apparatus for an installing result of the selling package (step S109-10). This querying (polling) is repeated until the installing has been completed in the current apparatus and the installing result is transmitted as a response.

Figure 11:
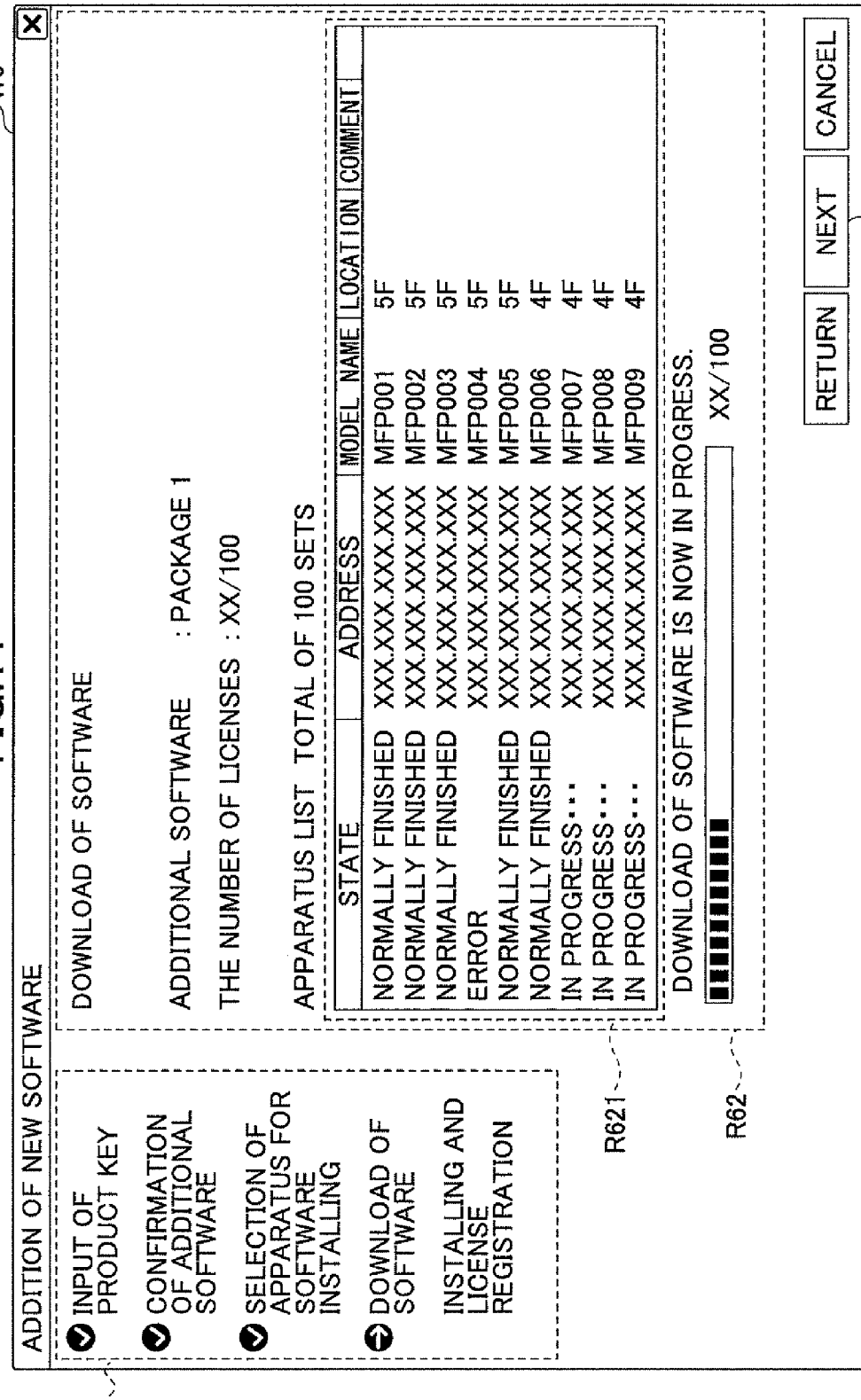
FIG. 11 shows an example of a download situation notification screen page according to the first embodiment of the present invention.

FIG. 11 shows an example of a notification screen page for a download situation according to the first embodiment.

While the above-mentioned installing and activating process (step S109-9) is carried out, the management tool 20 in the program introduction assistance apparatus 100 notifies the user of a process situation.

FIG. 11 shows the example of the notification screen page W6 that notifies the user that the management tool 20 is downloading the current selling package (component) in the current apparatus.

The notification screen page W6 has, the same as the selection screen page W4, a work stage information field R61 and a program introduction process information field R62. In the example shown in FIG. 11, the work stage information field R61 displays a progress situation that "selection of apparatus for software installing" has been finished and the stage of "download of software" is proceeded with. Further, the program introduction process information field R62 displays information to urge the user to confirm the contents of the current selling package to be downloaded, and information for confirming the contents "additional software (package name)" of the current selling package to be downloaded and the contents (the number of licenses) of the license thereof. It is noted that "the number of licenses" displayed as mentioned above is information based on a carrying out result of the license authentication processes (steps S109-5 and S109-6) by the programs introduction control part 23. That is, the number of the remaining licenses and the total number of licenses are those according to the authentication result.

Further, in the program introduction process information field R62, the apparatus list having items such as "state", "address", "model name", "location", "comment" and so forth, of the current apparatus is displayed as a download situation notification area R621. For example, in the example shown in FIG. 11, a software download situation (transmission and/or reception process situation) in the current apparatus such as [normally finished], [error] or [in progress], is displayed for the item "state" of the download situation notification area R621.

In the UI control part 21, when the event receiving part 211 has received the information obtaining process result (the carrying out result of obtaining the apparatus information) by the information obtaining part 22 from the program introduction control part 23, the screen page generating part 212 refers to the screen page parts that the screen page part storing part 213 has, and generates the above-mentioned notification screen page W6. For example, the screen page generating part 212 uses the respective screen page parts such as the stage item characters "download of software" to be displayed in the work stage information field R61, the item characters "additional software (package name)", "the number of licenses" and "apparatus list" and the download situation notification area 8621 to be displayed in the program introduction process information field R62, and generates the above-mentioned notification screen page W5. At this time, the screen page generating part 212 receives the package information obtained by the information obtaining part 22 from the program introduction control part 23 via the event receiving part 211, and generates the respective item values (display contents) of the above-mentioned program introduction process information field R62. Further, the screen page generating part 212 generates the respective item values (display contents) of the above-mentioned download situation notification area R621 based on the stored apparatus information.

Then, the screen page renewing part 214 renews the display screen page of the display device 102 from the notification screen page W5 to the notification screen page W6, in response to a screen page renewing request given by the screen page generating part 212. It is noted that the value of the item "state" of the download situation notification area R621 is renewed according to a carrying out result of the download process carried out by the program introduction control part 23, by means of the above-mentioned screen page generating and screen page renewing processes.

Thereby, the program introduction assistance apparatus 100 can notify the user of the progress situation of the program download process in the current apparatus.

The UI control part 21 receives an installing and activation carrying out request as a result of a [next] button of the notification screen page W6 being pressed by the user.

The program introduction assistance apparatus 100 transfers the received installing and activation carrying out request, from the UI control part 21 to the program introduction control part 23. Thereby, the installing and activation process is continued.

Figure 12:
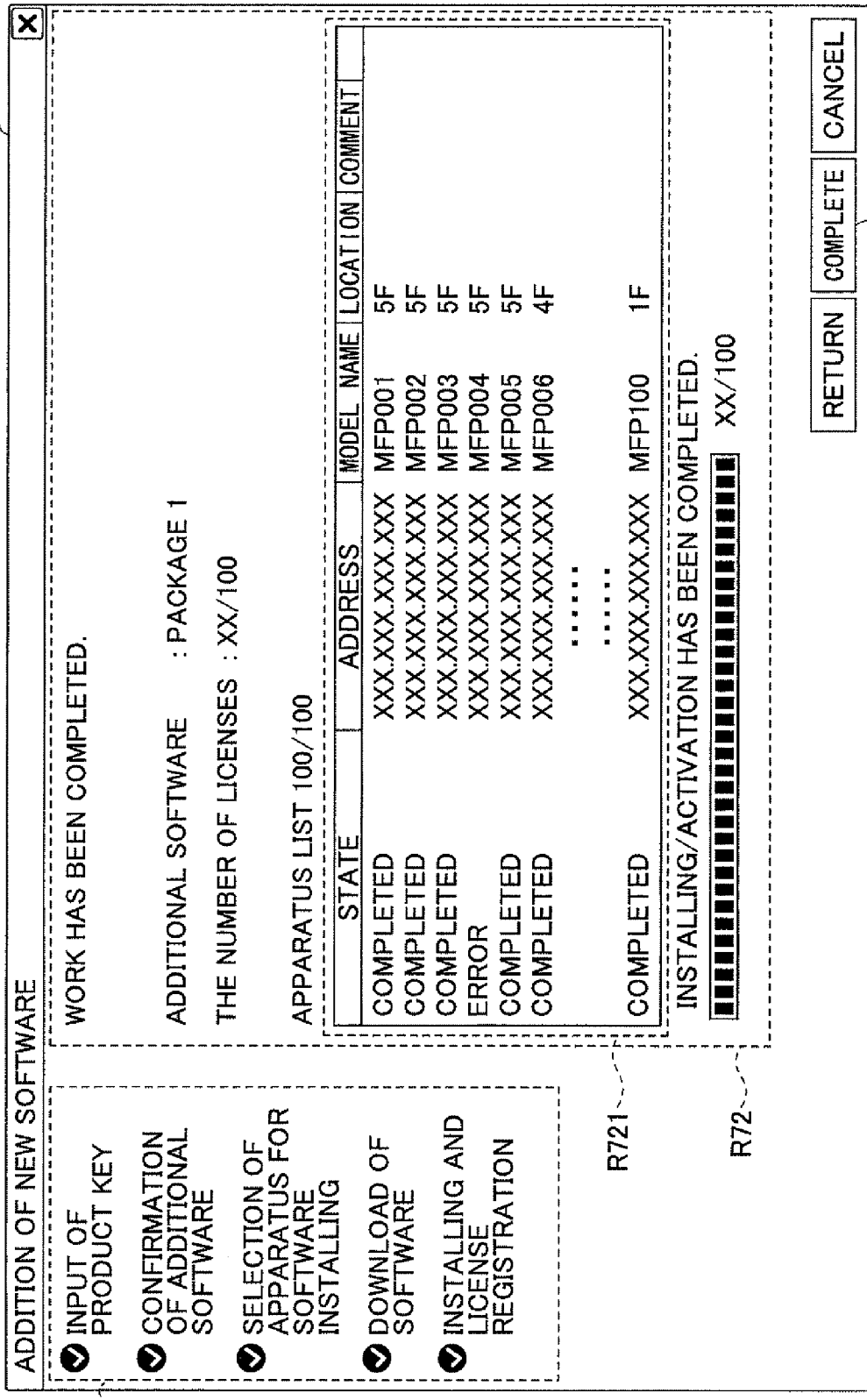
FIG. 12 shows an example of an installing completion notification screen page according to the first embodiment of the present invention.

FIG. 12 shows an example of a notification screen page for an installing completion according to the first embodiment.

As a result of the installing and activation process being thus continued, the program introduction control part 23 notifies the user of a process result from the management tool 20.

FIG. 12 shows the example of the notification screen page W7 that notifies the user of a result of the management tool 20 installing (including a result of activation) the selling package (component) in the current apparatus.

The notification screen page W7 has, the same as the notification screen page W6, a work stage information field R71 and a program introduction process information field R72. In the example shown in FIG. 12, the work stage information field R71 shows a progress situation that "installing and license registration" has been finished. The program introduction process information field R72 shows information urging the user to confirm the contents of the installing result (including the activation result), the contents of the current selling package "additional software (package name)" having been installed, and the contents of the license thereof "the number of licenses".

Further, in the program introduction process information field R72, the apparatus list having the items such as "state", "address", "model name", "location" and "comment" of the current apparatus are displayed as an installing result notification area 8721. For example, in the example shown in FIG. 12, for the item "state" of the installing result notification area R721, the software installing result in the current apparatus is displayed such as "completed", "error" or such.

In the UI control part 21, when the event receiving part 211 has received the installing result (the carrying out result of the installing and activation process) from the program introduction control part 23, the screen page generating part 212 refers to the screen page parts that the screen page part storing part 213 has, and generates the above-mentioned notification screen page W7. For example, the screen page generating part 212 uses the respective screen page parts of the work item characters "installing and license registration" to be displayed in the work stage information field R71, the item characters "additional software (package name)", "the number of licenses" and "apparatus list" and the installing result notification area R721 to be displayed in the program introduction process information field R72, and generates the above-mentioned notification screen page W7. It is noted that the screen page generating part 212 generates each item value (display contents) of the program introduction process information field R72 in the same way as that of the notification screen page W6 displayed in the previous work stage being generated. Further, the screen page generating part 212 generates the display contents of the item "state" of the installing result notification area R721 based on the installing result of the program introduction control part 23.

Then, the screen page renewing part 214 renews the display screen page of the display device 102 from the notification screen page W6 to the notification screen page W7, in response to a screen page renewing request given by the screen page generating part 212.

Thereby, the program introduction assistance apparatus 100 can notify the user of the carrying out result of the installing and activation process in the current apparatus.

The UI control part 21 receives a program introduction work finish request as a result of a [complete] button B7 of the notification screen page W7 being pressed by the user.

The program introduction assistance apparatus 100 transfers the received program introduction work finish request, from the UI control part 21 to the program introduction control part 23. Thereby, the program introduction work is finished.

<<Uninstalling and Deactivation Process>>

Figure 13:
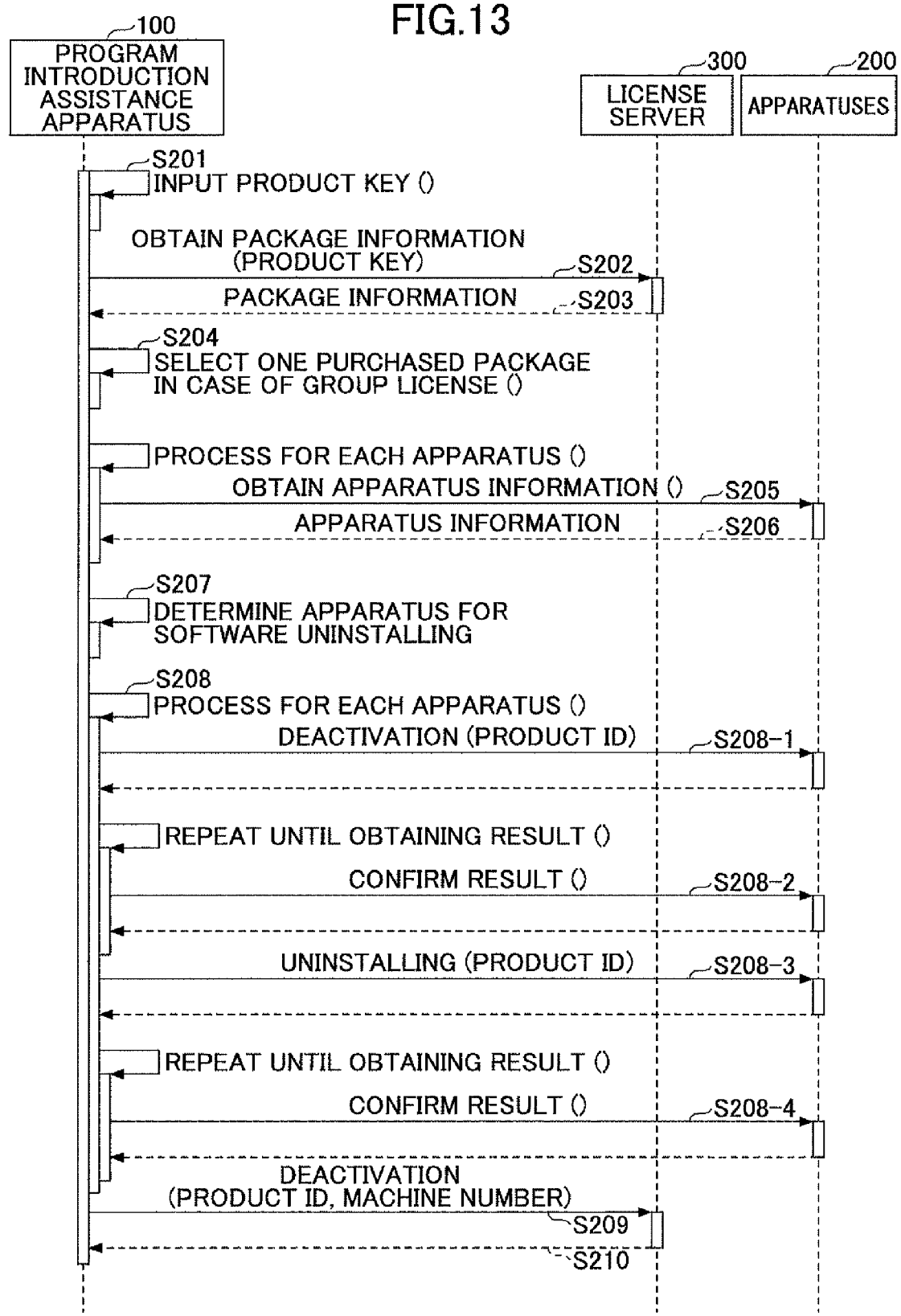
FIG. 13 is a sequence diagram showing an example of a procedure of an uninstalling and deactivation process according to the first embodiment of the present invention.

FIG. 13 is a sequence diagram showing an example of an uninstalling and deactivation process procedure according to the first embodiment.

Next, a display control process carried out in the uninstalling and deactivation process will be described.

In the program introduction assistance apparatus 100, when the management tool 20 is started up, the starting-up screen page W1 of FIG. 6 is displayed on the display device 102.

The program introduction assistance apparatus 100 receives a request for a service that the user desires, i.e., a program introduction work request, from the starting-up screen page W1 as an operating event EVN. It is noted that, hereinafter, a process procedure for a case where "uninstalling" is selected from the starting-up screen page W1 will be described with reference to FIG. 13.

In the UI control part 21, when the event receiving part 211 receives the user's input (operating event) of an instruction for starting uninstalling of a selling package from the starting-up screen page W1, the screen page generating part 212 causes the display device 102 to display a selection screen page for a product key PK to be uninstalled.

FIG. 14 shows one example of the selection screen page for a product key PK according to the first embodiment.

FIG. 14 shows the example of the selection screen page (setting screen page) W8 with which the management tool 21 urges the user to select a product key PK to be uninstalled.

The selection screen page W8 has a list information field R8 to display a list of apparatuses 200 or product keys PK. In the example shown in FIG. 14, the list information field R8 shows information to request the user to select a product key PK to be uninstalled.

Further, the list information field R8 shows a product key list having items such as "software name (and version)", "product key", "license mode" (license type), "the number of remaining licenses/the total number of licenses" (number of licenses: remaining/total), "term of validity" and "latest renewed date" of the installed selling package, as a selection area SL8, and the user can select therefrom one or plural product keys PK to be uninstalled.

In the UI control part 21, when the event receiving part 211 has received the uninstalling starting instruction (operating event), the screen page generating part 212 refers to the screen page parts that the screen page part storing part 213 stores, and generates the above-mentioned selection screen page W8. For example, the screen page generating part 212 uses the respective screen page parts such as characters "product key list" and the selection area SL8 to be displayed in the list information field R8, and generates the above-mentioned selection screen page W8. At this time, the screen page generating part 212 generates each item value (display contents) of the selection area SL8 based on stored data (carrying out result data that has been temporarily stored) stored when the queries of the apparatuses 200 have been carried out in the installing and activating processes.

Then, the screen page renewing part 214 renews the display screen page of the display device 102 from the starting-up screen page W1 to the selection screen page W8, in response to a screen page renewing request given by the screen page generating part 212.

Returning to the description of FIG. 13, when the product key PK of the selling package to be uninstalled (referred to as "current selling package", hereinafter) is selected by the user from the selection screen page W8 for a product key PK (step S201), the UI control part 21 transfers the selected product key PK to the program introduction control part 23.

The product introduction control part 23 then requests the information obtaining part 22 to obtain package information concerning the product key PK. As a result, the information obtaining part 22 designates the product key PK and transmits a request for obtaining package information concerning the product key PK to the license server 300 (step S202).

Next, the license server 300 transmits information (package information) stored as the record concerning the received product key PK to the program introduction assistance apparatus 100 as a response (step S203). In a case where the product key PK is of a group license, the package information for plural packages is transmitted as the response.

In the case where the product key PK is of a group license, that is, the page information for plural selling packages has been thus received, the UI control part 21 of the program introduction assistance apparatus 100 causes the display device 102 to display a selling package selection screen page including list information of the selling packages, and urges the user to select a selling package to be uninstalled (step S204). Hereinafter, the thus-selected selling package will be referred to as "current selling package".

Figure 15:
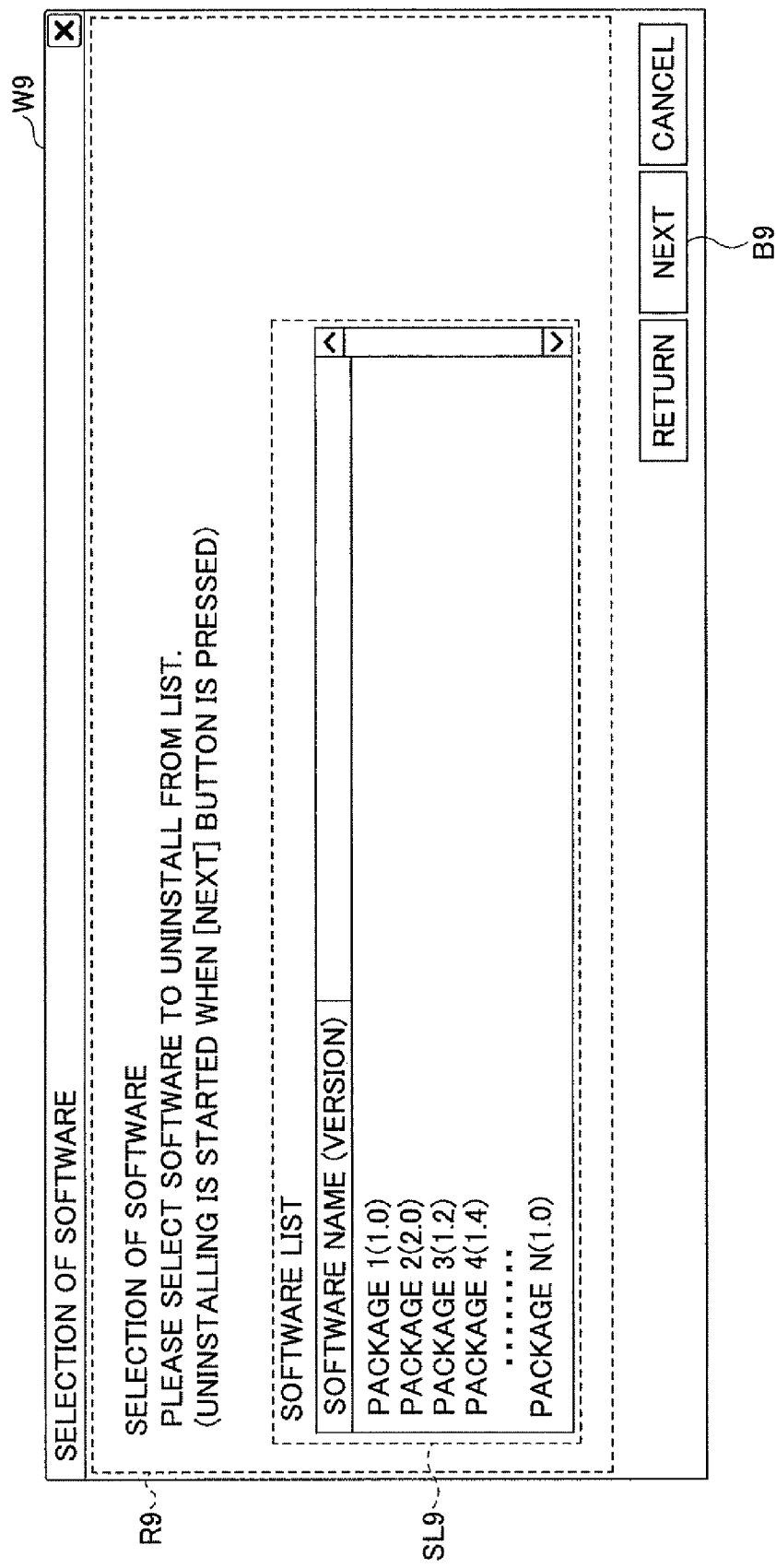
FIG. 15 shows an example of an uninstalling program selection screen page according to the first embodiment of the present invention.

FIG. 15 shows an example of a selection screen page for an uninstalling program according to the first embodiment.

FIG. 15 shows the example of the selection screen page (setting screen page) W9 with which the management tool 20 urges the user to select a current selling package to be uninstalled.

The selection screen page W9 has a program introduction process information field R9 that shows work that is currently being carried out. The example of the screen page shown in FIG. 15 shows information requesting the user to select a selling package (component) to be uninstalled in the program introduction process information field R9.

Further, the program introduction process information field R9 displays a software list having an item of "software name (and version)" of the installed selling packages in a selection area SL9, and thus, the user can select therefrom one or plural selling packages (components) to be uninstalled.

In the UI control part 21, when the event receiving part 211 has received the information obtaining process result (carrying out result of obtaining the package information) of the information obtaining part 22 from the program introduction control part 23, the screen page generating part 212 refers to the screen page parts that the screen page part storing part 213 stores, and generates the above-mentioned selection screen page W9. For example, the screen page generating part 212 uses the respective screen page parts such as characters "software list" and the selection area SL9 to be displayed in the program introduction process information field R9, and generates the above-mentioned selection screen page W9. At this time, the screen page generating part 212 generates each item value (display contents) of the above-mentioned selection area SL9 based on the stored information (data temporarily stored) stored when the queries of the apparatuses 200 have been carried out in the installing and activation processes.

Then, the screen page renewing part 214 renews the display screen page of the display device 102 from the selection screen page W8 to the selection screen page W9 in response to a screen page renewing request given by the screen page generating part 212.

As a result of a [next] button B9 of the selection screen page W9 being pressed by the user, the UI control part 21 receives a request for designating the selling package to be uninstalled (uninstalling work continuation instruction). Thereby, the UI control part 21 transfers the selection information of the current selling package to the program introduction control part 23.

Further, when the event receiving part 211 of the UI control part 21 has received the user's input of the uninstalling work continuation instruction (operating event) from the selection screen page W9, the screen page generating part 212 causes the display device 102 to display a selection screen page including the list of the apparatuses 200 and urges the user to select the apparatus 200 to have the software uninstalled.

FIG. 16 shows an example of the selection screen page for uninstalling apparatus according to the first embodiment.

FIG. 16 shows the example of the selection screen page (setting screen page) W10 with which the management tool 20 urges the user to select the apparatus 200 from which the software is to be uninstalled.

The selection screen page W10 includes, the same as the selection screen page W9, the program introduction process information field R10. The example of the screen page shown in FIG. 16 displays information requesting the user to select the apparatus 200 to have the software uninstalled, and information for confirming the contents of the current selling package to be uninstalled "software (package name)" and the contents of the license thereof "the number of licenses" in the program introduction process information field R10.

Further, the program introduction process information field R10 displays an apparatus list having items such as "address", "model name", "machine number" and "location" of the apparatuses 200 in a selection area SL10, and the user can select the apparatus 200 to have the software uninstalled therefrom.

The user can select the apparatus 200 from which the software is to be uninstalled by pressing a check box ☐ (☐→■) of the selection area SL10 in the program introduction process information field R10. Further, in the program introduction process information field R10, the user may press a [select all] button to select all the apparatuses 200 displayed in the selection area SL10. On the other hand, the user may press a [cancel all selection] button to cancel all the selections of the apparatuses 200. Further, in the program introduction process information field R10, in the selection area SL10, it is possible to select the plural apparatuses 200 from each of which the software is to be uninstalled.

In the UI control part 21, when the event receiving part 211 receives the uninstalling work continuation instruction (operating event), the screen page generating part 212 refers to the screen page parts that the screen page part storing part 213 stores, and generates the above-mentioned selection screen page W10. For example, the screen page generating part 212 uses the respective screen page parts such as item characters "software (package name)", "the number of licenses", the selection area SL10, the [select all] button, the [cancel all selection] button, and so forth, to be displayed in the program introduction process information field R10, and generates the above-mentioned selection screen page W10.

At this time, based on the current package information selection information obtained from the selection screen page W9, the screen page generating part 212 generates the respective items (display contents) of the above-mentioned program introduction process information field R10. Further, the screen page generating part 212 generates the respective items (display contents) of the above-mentioned selection area SL10 based on the stored apparatus information (temporarily stored carrying out result data) stored when the queries of the apparatuses 200 have been carried out in the installing and activation processes, and so forth.

Then, the screen page renewing part 214 renews the display screen page of the display device 102 from the selection screen page W9 to the selection screen page W10 according to a screen page renewing request given by the screen page generating part 212.

The UI control part 21 receives the designation request (selection information) for designating (selecting) the apparatuses for software uninstalling as a result of a [next] button B10 in the selection screen page W10 being pressed by the user.

The program introduction assistance apparatus 100 transfers the received selection information that the apparatuses 200 for software uninstalling have been selected, from the UI control part 21 to the program introduction control part 23.

Returning to the description of FIG. 13, the program introduction control part 23 requests the information obtain part 22 to obtain the apparatus information of the apparatuses for software uninstalling based on the above-mentioned selection information. As a result, the information obtaining part 22 transmits a request for obtaining the apparatus information to the respective apparatuses 200 selected as the apparatuses for software uninstalling (step S205).

Each apparatus 200 having received the request for obtaining the apparatus information obtains information stored in the installing information management table, and transmits information including the thus-obtained information and the machine number of the apparatus 200 to the program introduction assistance apparatus 100 as the apparatus information as a response (step S206).

Next, in the program introduction assistance apparatus 100, the program introduction control part 23 compares the package information obtained in step S203 with the apparatus information obtained in step S206 from the respective apparatuses 200, and determines the apparatus 200 in which the selling package concerning the package information has been installed (step S207). Specifically, the apparatus 200 concerning the apparatus information including the product ID (the product ID of the selling package) included in the package information is determined as the apparatus 200 in which the selling package has been installed (i.e., the apparatus for uninstalling with the selling package).

The next step S208 is a loop process to be carried out for each apparatus 200 from which the selling package is to be uninstalled. The apparatus 200 to be processed in the loop process will be referred to as a "current apparatus", hereinafter.

In the program introduction assistance apparatus 100, the program introduction control part 23 designates the product ID of the current selling package, and transmits a deactivation request (a request to delete the license file) to the current apparatus (step S208-1). The current apparatus deletes the license file 90 concerning the designated product ID in response to the request.

Next, in the program introduction assistance apparatus 100, the program introduction control part 23 queries the current apparatus for a result of the deletion of the license file 90 (step S208-2). The querying (polling) is repeated until the deletion of the license file is completed in the current apparatus and the process result of the deletion process is transmitted from the current apparatus as a return.

Next, in the program introduction assistance apparatus 100, the program introduction control part 23 designates the product ID of the current selling package, and transmits an uninstalling request (a request to delete the current selling package) to the current apparatus (step S208-3). The current apparatus uninstalls (deletes) the current selling package concerning the designated product ID in response to the request.

Next, in the program introduction assistance apparatus 100, the program introduction control part 23 queries the current apparatus for a result of uninstalling the current selling package (step S208-4). The querying (polling) is repeated until the uninstalling of the current selling package is completed in the current apparatus and the process result of the uninstalling process is transmitted from the current apparatus as a return.

After step S208 is carried out for all the apparatuses 200 from which the selling package is to be uninstalled, the program introduction control part 23 of the program introduction assistance apparatus 100 transmits a deactivation request (a request to release the license) to the license server 300 designating the product ID of the current selling package and the machine numbers of all the apparatuses 200 from which the selling package is to be uninstalled (step S209).

The license server 300 changes the statuses of the records concerning the designated product ID and machine numbers from "check out" to "check in" in the license management table. That is, information indicating that the licenses are not being used is stored in the license management table. It is noted that the deactivation can be carried out on the license for which the status is "check out". Therefore, in a case where the status of the record to be processed is not "check out", the license server 300 determines that the deactivating has failed.

Next, the license server 300 transmits the deactivation process result (whether the process has succeeded) to the program introduction assistance apparatus 100 as a response (step S210).

Figure 17:
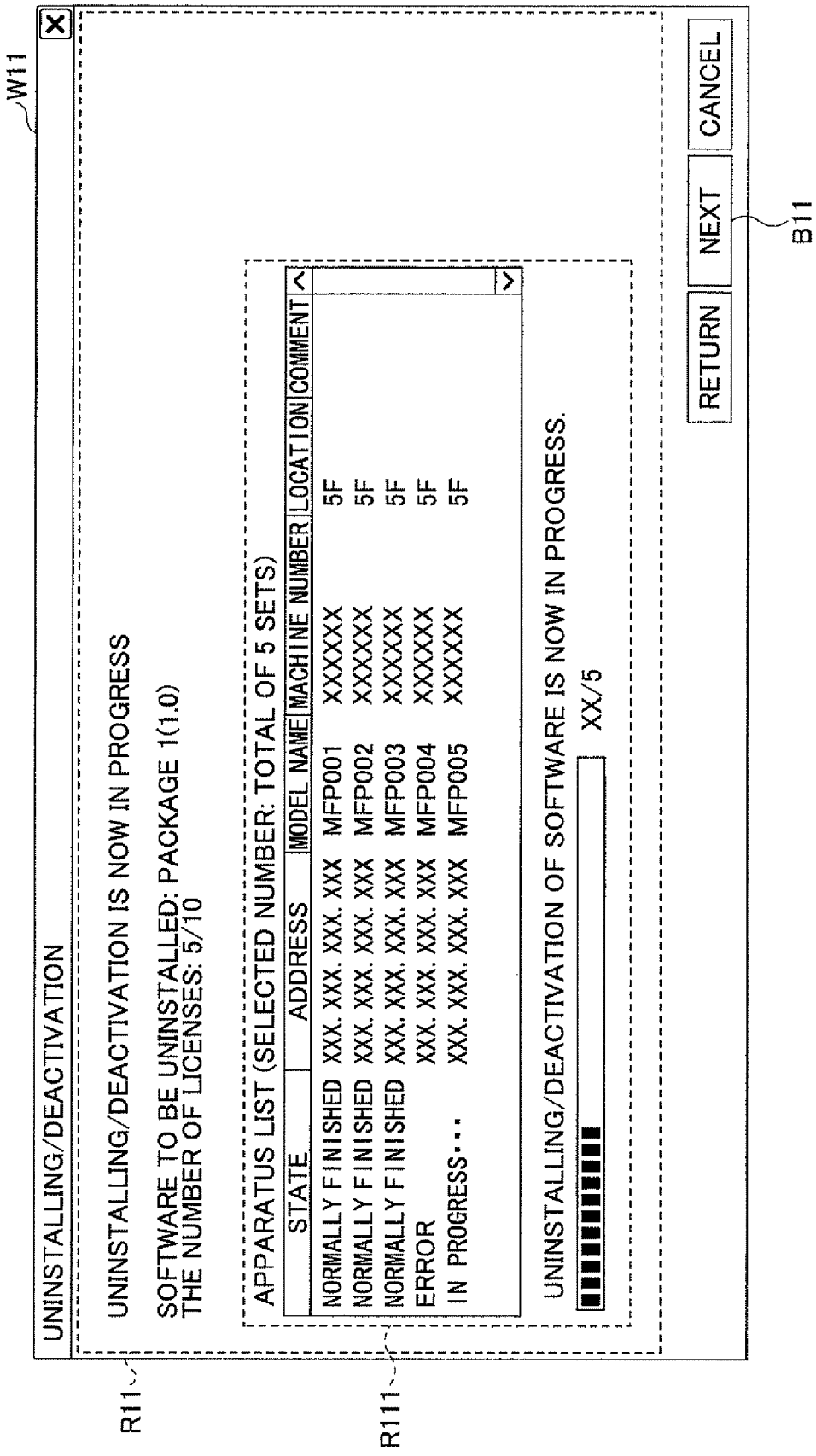
FIG. 17 shows an example of an uninstalling situation notification screen page according to the first embodiment of the present invention.

FIG. 17 shows a notification screen page for an uninstalling situation according to the first embodiment.

While the above-mentioned uninstalling processes (steps S208-3 and S208-4) are in progress, the management tool 20 of the program introduction assistance apparatus 100 notifies the user of the uninstalling situation.

FIG. 17 shows the example of the notification screen page W11 that notifies the user that the management tool 20 is currently uninstalling the current selling package (component) from the current apparatus.

The notification screen page W11 has, the same as the selection screen page W10, a program introduction process information field R11. In the example shown in FIG. 17, the program introduction process information field R11 displays information to urge the user to confirm the contents of the current selling package to be uninstalled, and information for confirming the contents "software (package name)" of the current selling package to be uninstalled and the contents (the number of licenses) of the license thereof. It is noted that "the number of licenses" displayed as mentioned above is information based on stored information (data temporarily stored) stored when the queries of the apparatuses 200 have been carried out in the installing and activation processes, and so forth. That is, the number of the remaining licenses is the latest value (current value).

Further, in the program introduction process information field R11, an apparatus list having items such as "state", "address", "model name", "machine number", "location" and so forth, of the current apparatus is displayed as an uninstalling situation notification area R111. For example, in the example shown in FIG. 17, a software uninstalling situation in the current apparatus such as [normally finished], [error] or [in progress], is displayed for the item "state" of the uninstalling situation notification area R111.

In the UI control part 21, when the event receiving part 211 has received the information obtaining process result (the carrying out result of obtaining the apparatus information) by the information obtaining part 22 from the program introduction control part 23, the screen page generating part 212 refers to the screen page parts that the screen page part storing part 213 has, and generates the above-mentioned notification screen page W11. For example, the screen page generating part 212 uses the respective screen page parts such as the item characters "software (package name)", "the number of licenses" and "apparatus list" and the uninstalling situation notification area R111 to be displayed in the program introduction process information field R11, and generates the above-mentioned notification screen page W11. It is noted that the screen page generating part 212 generates each item value (display contents) of the program introduction process information field R11, in the same way as that of the generating the selection screen page displayed in the previous stage.

Then, the screen page renewing part 214 renews the display screen page of the display device 102 from the selection screen page W10 to the notification screen page W11, in response to a screen page renewing request given by the screen page generating part 212. It is noted that the value of the item "state" of the uninstalling situation notification area R111 is renewed according to a carrying out result of the uninstalling process carried out by the program introduction control part 23, by means of the above-mentioned screen page generating and screen page renewing processes.

Thereby, the program introduction assistance apparatus 100 can notify the user of the progress situation of the uninstalling process in the current apparatus.

The UI control part 21 receives an uninstalling and deactivation continuation request as a result of a [next] button B11 of the notification screen page W11 being pressed by the user.

The program introduction assistance apparatus 100 transfers the received uninstalling and deactivation continuation request, from the UI control part 21 to the program introduction control part 23. Thereby, the uninstalling and deactivation process is continued.

FIG. 18 shows an example of a notification screen page for an uninstalling completion according to the first embodiment.

As a result of the uninstalling and deactivation process being thus continued, the program introduction control part 23 notifies the user of a process result from the management tool 20.

FIG. 18 shows the example of the notification screen page W12 that notifies the user of a result of the management tool 20 uninstalling (including a result of deactivation) the selling package (component) from the current apparatus.

The notification screen page W12 has, the same as the notification screen page W11, a program introduction process information field R12. In the example shown in FIG. 18, the program introduction process information field R12 shows information urging the user to confirm the contents of the uninstalling result (including the deactivation result), the contents of the current selling package "software (package name)" having been thus uninstalled, and the contents of the license thereof "the number of licenses".

Further, in the program introduction process information field R12, an apparatus list having items such as "state", "address", "model name", "machine number" and "location" of the current apparatus are displayed as an uninstalling result notification area R121. For example, in the example shown in FIG. 18, for the item "state" of the uninstalling result notification area R121, the software uninstalling result in the current apparatus is displayed such as "completed", "error" or such.

In the UI control part 21, when the event receiving part 211 has received the uninstalling result (the carrying out result of the uninstalling and deactivation process) from the program introduction control part 23, the screen page generating part 212 refers to the screen page parts that the screen page part storing part 213 has, and generates the above-mentioned notification screen page W12. For example, the screen page generating part 212 uses the respective screen page parts of item characters "software (package name)", "the number of licenses" and "apparatus list" and the uninstalling result notification area R121 to be displayed in the program introduction process information field R12, and generates the above-mentioned notification screen page W12. It is noted that the screen page generating part 212 generates each item value (display contents) of the program introduction process information field R12 in the same way as that of the notification screen page W11 displayed in the previous work stage being generated. Further, the screen page generating part 212 generates the display contents of the item "state" of the uninstalling result notification area R121 based on the uninstalling result of the program introduction control part 23.

Then, the screen page renewing part 214 renews the display screen page of the display device 102 from the notification screen page W11 to the notification screen page W12, in response to a screen page renewing request given by the screen page generating part 212.

Thereby, the program introduction assistance apparatus 100 can notify the user of the carrying out result of the uninstalling and deactivation process in the current apparatus.

The UI control part 21 receives a program introduction (actually, software uninstalling and deactivation as mentioned above) work finish request as a result of a [complete] button B12 of the notification screen page W12 being pressed by the user.

The program introduction assistance apparatus 100 transfers the received program introduction work finish request, from the UI control part 21 to the program introduction control part 23. Thereby, the program introduction (actually, software uninstalling and deactivation as mentioned above) work is finished.

Summary of First Embodiment

Thus, according to the program introduction assistance apparatus 100 in the first embodiment, the management tool 20 that realizes the program introduction assistance function carries out the following display control function.

The UI control part 21 of the management tool 20 transfers the carrying out request received by the display screen page (GUI) to the program introduction control part 23. The management tool 20 stores the screen page parts used for generating the display screen pages, generates the display screen pages that show information (the process situation and the process completion) corresponding to the work stages using the screen page parts based on the carrying out request received by the UI control part 21 and/or the carrying out results of the program introduction processes carried out in response to the carrying out request, and renews the display screen pages.

That is, the program introduction assistance apparatus 100 generates the display screen pages corresponding to the work stages based on the user's carrying out request and/or the carrying out results of the program introduction processes carried out in response to the carrying out request, and updates the display screen pages.

Thereby, the program introduction assistance apparatus 100 according to the first embodiment can show the user the information concerning the program introduction processes such as the progress situations and carrying out results during the carried out work stages (in appropriate timing), and can appropriately assist in the user's program introduction work.

The first embodiment has been described. The "display control function", that the program introduction assistance function according to the first embodiment has, is realized as a result of a program that is obtained from encoding the respective procedures described above with reference to figures by a programming language suitable to the operating environment (platform) being executed by the CPU 106.

The above-mentioned program may be stored in the computer readable information recording medium 103a. The recording medium 103a is, for example, a floppy (registered trademark) disk, a CD (Compact Disk), a DVD (Digital Versatile Disk), or such. Further, in a case where the program introduction assistance apparatus 100 has an external storage I/F (interface) (not shown), the above-mentioned program may be stored in a computer readable information recording medium such as a SD memory card, a USB (Universal Serial Bus) memory, or such.

Therefore, the above-mentioned program can be installed in the program introduction assistance apparatus 100 by using the drive device 103 by which the recording medium 103a is readable or such, as a result of the program being stored in the recording medium 103a. Further, since the program introduction assistance apparatus 100 includes the interface device 107, the above-mentioned program may be downloaded by using a telecommunication line such as the Internet, and then, installed in the program introduction assistance apparatus 100.

The present invention is not limited to the specifically disclosed embodiments, and variations and modifications may be made without departing from the scope of the present invention.

The present application is based on Japanese priority application No. 2009-212447, filed Sep. 14, 2009, the entire contents of which are hereby incorporated herein by reference.

What is claimed is:

1. An information processing apparatus for connection with plural apparatuses via a predetermined data transmission path and for connection with a license server, the information processing apparatus including a processor to execute program parts comprising:
   an obtaining part that obtains, from apparatuses selected from the plural apparatuses, apparatus information about the selected apparatuses, the apparatus information including information about one or more previously installed programs existing in the selected apparatuses, the obtaining part further sending the apparatus information to the license server and obtaining apparatus-specific licenses for all the selected apparatuses from the license server responding to the apparatus information, a single trigger being executed by a user on a display screen page upon selecting all the selected apparatuses from the plural apparatuses, the single trigger causing the apparatus information about the selected apparatuses to be automatically obtained, and the single trigger also causing the obtainment of the apparatus-specific licenses to be performed in one bundle for all the selected apparatuses;

a control part that controls, based on the apparatus information, a program introduction process that is carried out in a plurality of work stages of work of introducing a program to the selected apparatuses based on the apparatus-specific licenses, the apparatus-specific licenses being obtained for the selected apparatuses from the license server responding to the apparatus information, the apparatus information being obtained from the selected apparatuses and sent to the license server;

a generation part that generates display screen pages corresponding to the work stages, based on a carrying out request of the user and/or carrying out results of one or more of the program introduction processes that have been carried out by the control part in response to the carrying out request; and a renewing part that renews the display screen page currently displayed on a display device of the information processing apparatus with the currently generated display screen page according to a renewing request of the generation part, wherein the control part is configured to obtain, from the selected apparatuses, information indicative of a result of introducing the program to the selected apparatuses, and the generation part is configured to generate, based on the information indicative of the result of introducing the program and obtained from the selected apparatuses, a display screen page that shows, on a program-specific basis for each of the selected apparatuses, an indication of successful completion or failure of the program introduction process that is performed based on the apparatus information including the information about one or more previously installed programs existing in the selected apparatuses and obtained from the selected apparatuses.

2. The information processing apparatus as claimed in claim 1, further comprising:

a storing part that stores one or plural screen page parts that are used to produce the display screen pages, wherein the generation part generates the display screen pages that are used to show information corresponding to the work stages to the user by using the screen page parts that are stored by the storing part, based on the carrying out request of the user and/or the carrying out results of the program introduction processes that have been carried out by the control part in response to the carrying out request.

3. The information processing apparatus as claimed in claim 1, wherein the generation part generates a setting screen page that is used by the user to request operation settings for processes carried out in the work stages, based on the carrying out request of the user and/or the carrying out results of the program introduction processes that have been carried out by the control part in response to the carrying out request.

4. The information processing apparatus as claimed in claim 1, wherein the generation part generates a confirmation screen page that is used to urge the user to confirm process results in the work stages, a notification screen page that is used to notify the user of process situations in the work stages and/or a notification screen page that is used to notify the user of completions of the processes in the work stages, based on the carrying out results of the program introduction processes that have been carried out by the control part in response to the carrying out request.

5. The information processing apparatus as claimed in claim 1, wherein the control part controls carrying out of an installing and activation process carried out in the work stages in the work of introducing the program to the selected apparatuses, and the generation part generates the display screen page corresponding to the work stages of installing and activation work, based on an installing and activation carrying out request received from the user and/or carrying out results of the installing and activation processes carried out by the control part in response to the carrying out request.

6. The information processing apparatus as claimed in claim 1, wherein the control part controls carrying out of an uninstalling and deactivation process carried out in the work stages in the work of introducing the program to the selected apparatuses, and the generation part generates the display screen page corresponding to the work stages of uninstalling and deactivation work, based on an uninstalling and deactivation carrying out request received from the user and/or carrying out results of the uninstalling and deactivation processes carried out by the control part in response to the carrying out request.

7. The information processing apparatus as claimed in claim 1, wherein the generation part generates the display screen pages that have work stage information fields that show information concerning the work stages of the requested work of introducing the program to the selected apparatuses and progress of the work stages, and program introduction process information fields that show information concerning the program introduction processes carried out in the work stages.

8. The information processing apparatus as claimed in claim 1, wherein the display screen page shows a plurality of indications of successful completion or failure of program introduction processes with respect to a plurality of the selected apparatuses, each of the indications showing successful completion or failure of the program introduction process with respect to a corresponding one of the selected apparatuses.

9. A program introduction assistance system in which plural apparatuses and an information processing apparatus, that carries out a program introduction process to introduce a program, are connected via a predetermined data transmission path, and the information processing apparatus is connected to a license server, the program introduction assistance system including a processor to execute program parts comprising:
- an obtaining part that obtains, from apparatuses selected from the plural apparatuses, apparatus information about the selected apparatuses, the apparatus information including information about one or more previously installed programs existing in the selected apparatuses, the obtaining part further sending the apparatus information to the license server and obtaining apparatus-specific licenses for all the selected apparatuses from the license server responding to the apparatus information, a single trigger being executed by a user on a display screen page upon selecting all the selected apparatuses from the plural apparatuses, the single trigger causing the apparatus information about the selected apparatuses to be automatically obtained, and the single trigger also causing the obtainment of the apparatus-specific licenses to be performed in one bundle for all the selected apparatuses;
- a control part that controls, based on the apparatus information, the program introduction process in a plurality of work stages of work of introducing the program to the selected apparatuses carried out by the information processing apparatus based on the apparatus-specific licenses, the apparatus-specific licenses being obtained for the selected apparatuses from the license server responding to the apparatus information, the apparatus information being obtained from the selected apparatuses and sent to the license server;
- a generation part that generates display screen pages corresponding to the work stages, based on a carrying out request of the user and/or carrying out results of one or more of the program introduction processes that have been controlled out by the control part in response to the carrying out request; and
- a renewing part that renews the display screen page currently displayed on a display device of the information processing apparatus with the currently generated display screen page according to a renewing request of the generation part,
- wherein the control part is configured to obtain, from the selected apparatuses, information indicative of a result of introducing the program to the selected apparatuses, and the generation part is configured to generate, based on the information indicative of the result of introducing the program and obtained from the selected apparatuses, a display screen page that shows, on a program-specific basis for each of the selected apparatuses, an indication of successful completion or failure of the program introduction process that is performed based on the apparatus information including the information about one or more previously installed programs existing in the selected apparatuses and obtained from the selected apparatuses.

10. A non-transitory computer readable information recording medium storing a display control program which is executed by a computer processor of an information processing apparatus that is connected to a license server and is connected with plural apparatuses via a predetermined data transmission path, which display control program, when executed by the computer processor, carries out:
- obtaining, from apparatuses selected from the plural apparatuses, apparatus information about the selected apparatuses, the apparatus information including information about one or more previously installed programs existing in the selected apparatuses;
- sending the apparatus information to the license server and obtaining apparatus-specific licenses for all the selected apparatuses from the license server responding to the apparatus information, a single trigger being executed by a user on a display screen page upon selecting all the selected apparatuses from the plural apparatuses, the single trigger causing the apparatus information about the selected apparatuses to be automatically obtained, and the single trigger also causing the obtainment of the apparatus-specific licenses to be performed in one bundle for all the selected apparatuses;
- controlling, based on the apparatus information, a program introduction process that is carried out in a plurality of work stages of work of introducing a program to the selected apparatuses based on the apparatus-specific licenses, the apparatus-specific licenses being obtained for the selected apparatuses from the license server responding to the apparatus information, the apparatus information being obtained from the selected apparatuses and sent to the license server;
- generating display screen pages corresponding to the work stages, based on a carrying out request of the user and/or a carrying out results of one or more of the program introduction processes that have been carried out by the control part in response to the carrying out request; and
- renewing the display screen pages of a display device of the information processing apparatus according to a renewing request,
- wherein the step of controlling is configured to obtain, from the selected apparatuses, information indicative of a result of introducing the program to the selected apparatuses, and the step of generating display screen pages includes generating, based on the information indicative of the result of introducing the program and obtained from the selected apparatuses, a display screen page that shows, on a program-specific basis for each of the selected apparatuses, an indication of successful completion or failure of the program introduction process that is performed based on the apparatus information including the information about one or more previously installed programs existing in the selected apparatuses and obtained from the selected apparatuses.

\* \* \* \* \*